(12) United States Patent
Hilberer

(10) Patent No.: US 7,972,418 B2
(45) Date of Patent: Jul. 5, 2011

(54) COMPRESSED AIR SUPPLY DEVICE

(75) Inventor: Eduard Hilberer, Hockenheim (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 260 days.

(21) Appl. No.: 12/366,307

(22) Filed: Feb. 5, 2009

(65) Prior Publication Data

US 2009/0199522 A1   Aug. 13, 2009

Related U.S. Application Data

(63) Continuation of application No. PCT/EP2007/007026, filed on Aug. 8, 2007.

(30) Foreign Application Priority Data

Aug. 8, 2006   (DE) .................. 10 2006 037 311

(51) Int. Cl.
   *B60T 17/00*   (2006.01)
   *B01D 53/02*   (2006.01)
(52) U.S. Cl. .............. 95/117; 96/147; 55/DIG. 17
(58) Field of Classification Search ............ 96/108, 96/147; 95/117; 55/515, DIG. 17; 34/80, 34/472, 473; 210/DIG. 17
   See application file for complete search history.

(56) References Cited

U.S. PATENT DOCUMENTS

| | | | | |
|---|---|---|---|---|
| 2,675,886 | A * | 4/1954 | McMullen | 55/507 |
| 4,052,307 | A * | 10/1977 | Humbert, Jr. | 210/130 |
| 4,719,012 | A * | 1/1988 | Groezinger et al. | 210/232 |
| 4,816,047 | A * | 3/1989 | Neal | 96/137 |
| 4,946,485 | A * | 8/1990 | Larsson | 96/152 |
| 4,948,505 | A * | 8/1990 | Petrucci et al. | 210/238 |
| 5,110,327 | A * | 5/1992 | Smith | 96/113 |
| 5,595,588 | A | 1/1997 | Blevins | |
| 5,762,671 | A * | 6/1998 | Farrow et al. | 55/496 |
| 5,792,245 | A * | 8/1998 | Unger et al. | 96/137 |
| 5,876,600 | A * | 3/1999 | Matsubara et al. | 210/443 |
| 6,193,884 | B1 * | 2/2001 | Magnusson et al. | 210/235 |
| 6,440,188 | B1 * | 8/2002 | Clements et al. | 55/378 |
| 6,558,457 | B1 * | 5/2003 | Kolczyk | 96/134 |

(Continued)

FOREIGN PATENT DOCUMENTS

EP    0 234 229 A2   9/1987

(Continued)

OTHER PUBLICATIONS

International Search Report of PCT/EP2007/007026 dated Dec. 13, 2007 w/English translation (six (6) pages).

(Continued)

*Primary Examiner* — Frank M Lawrence
(74) *Attorney, Agent, or Firm* — Crowell & Moring LLP

(57) ABSTRACT

A compressed air supply device for a commercial vehicle is provided. The compressed air supply device includes a valve housing and an essentially axially symmetrical, exchangeable air-drying cartridge which is connected to the valve housing. The valve housing and the air-drying cartridge are connected via an essentially circular seal which lies in a plane perpendicular to the axis of the air-drying cartridge. The valve housing and the air-drying cartridge can be coupled to each other by being brought together in an axially parallel manner. The valve housing and the air-drying cartridge have features which permit a leak-proof connection between the valve housing and the air-drying cartridge at one or more angular positions of the air-drying cartridge relative to the valve housing.

17 Claims, 22 Drawing Sheets

U.S. PATENT DOCUMENTS

| | | | |
|---|---|---|---|
| 7,100,305 B2 * | 9/2006 | Hoffman et al. | 34/351 |
| 7,294,161 B2 * | 11/2007 | Connor et al. | 55/498 |
| 2001/0037969 A1 * | 11/2001 | Stankowski | 210/348 |
| 2004/0094036 A1 | 5/2004 | Nichols et al. | |
| 2009/0199523 A1 * | 8/2009 | Hilberer | 55/385.3 |

FOREIGN PATENT DOCUMENTS

| | | |
|---|---|---|
| EP | 0 608 606 A1 | 8/1994 |
| WO | WO 2005/051521 A1 | 6/2005 |

OTHER PUBLICATIONS

International Search Report of PCT/EP2007/007025 dated Dec. 13, 2007 w/English translation (six (6) pages).

Corrected International Report on Patentability (Chapter II) in German Language mailed Jun. 22, 2009.

Corrected English Translation of the International Report on Patentability mailed Oct. 22, 2009.

\* cited by examiner

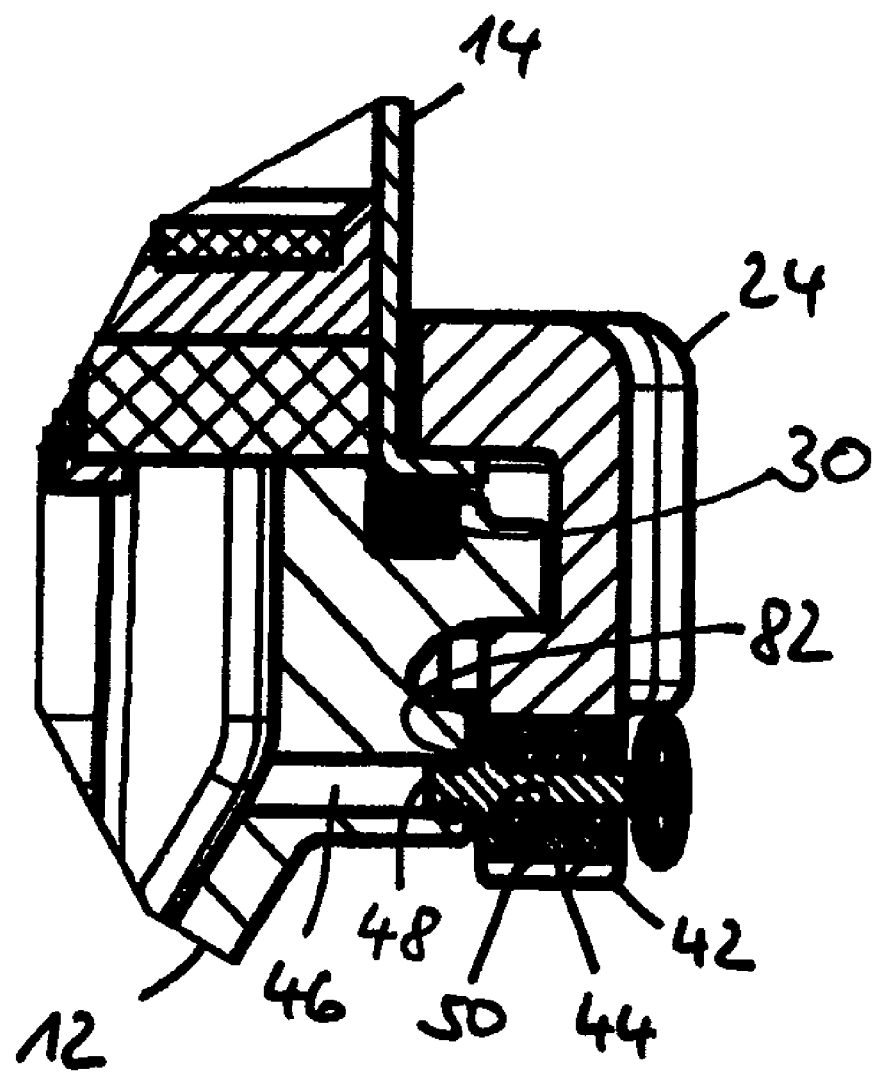

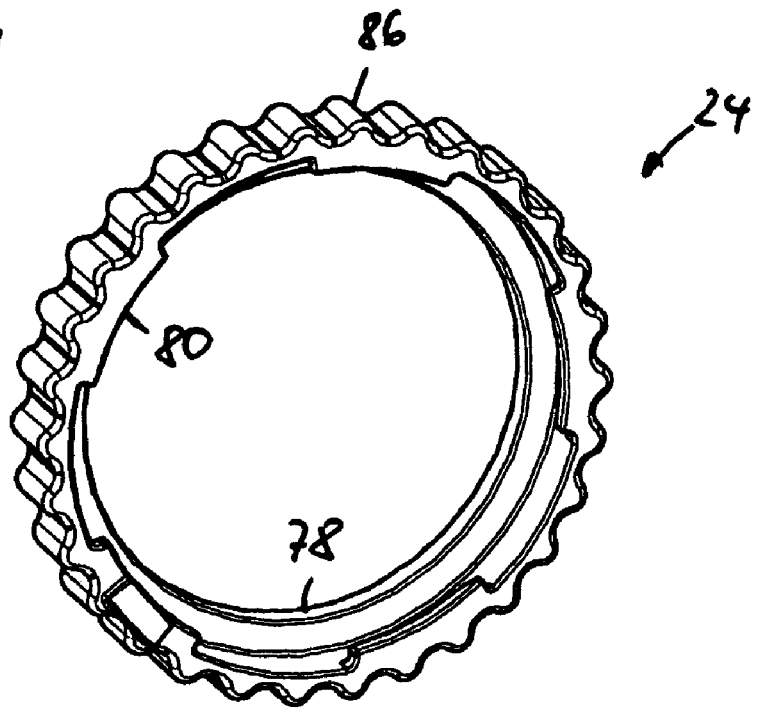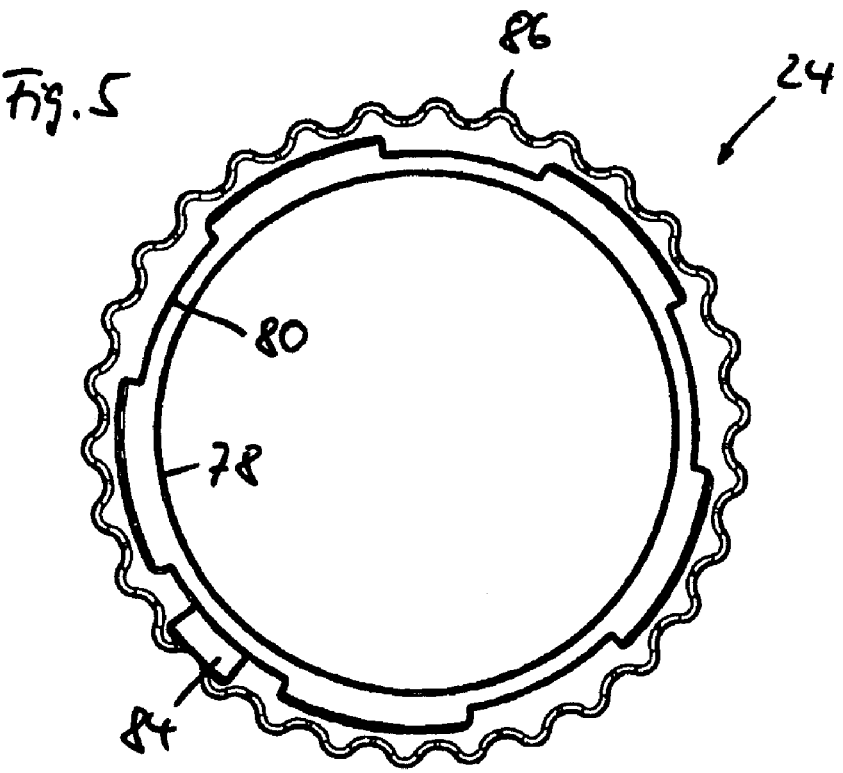

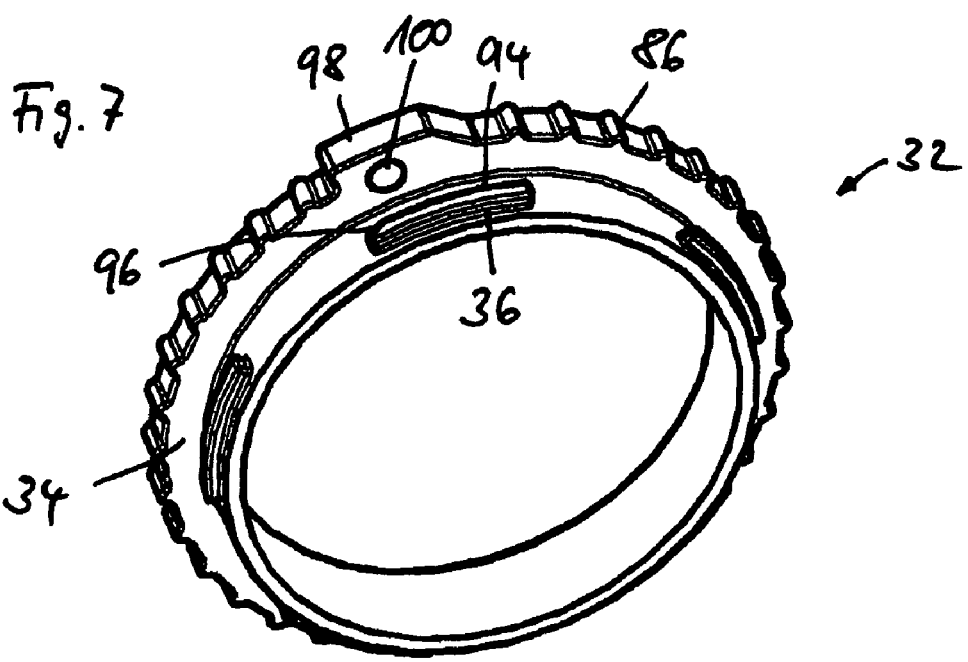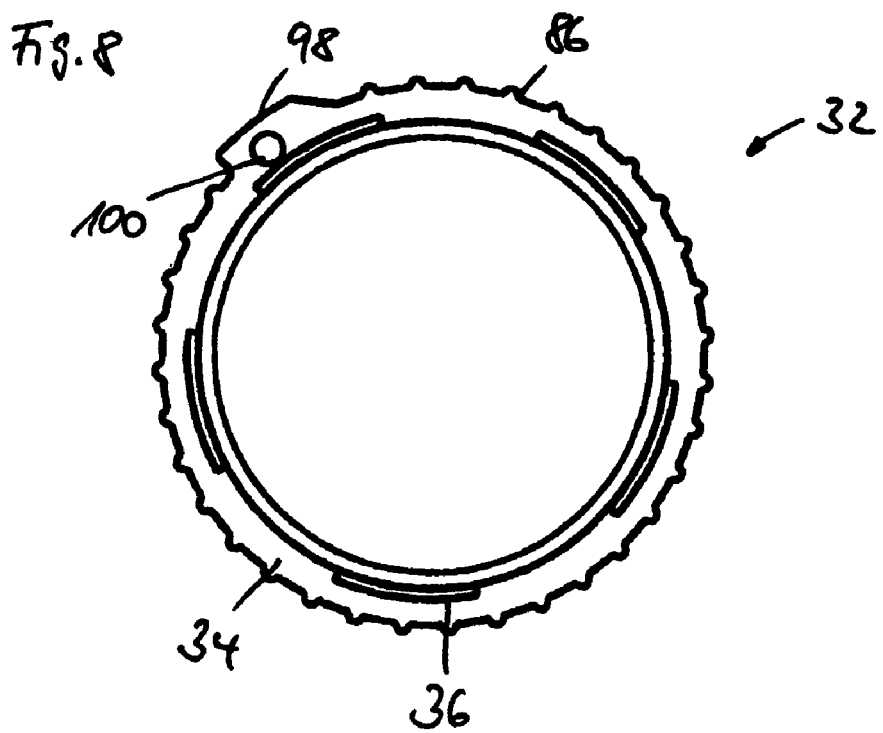

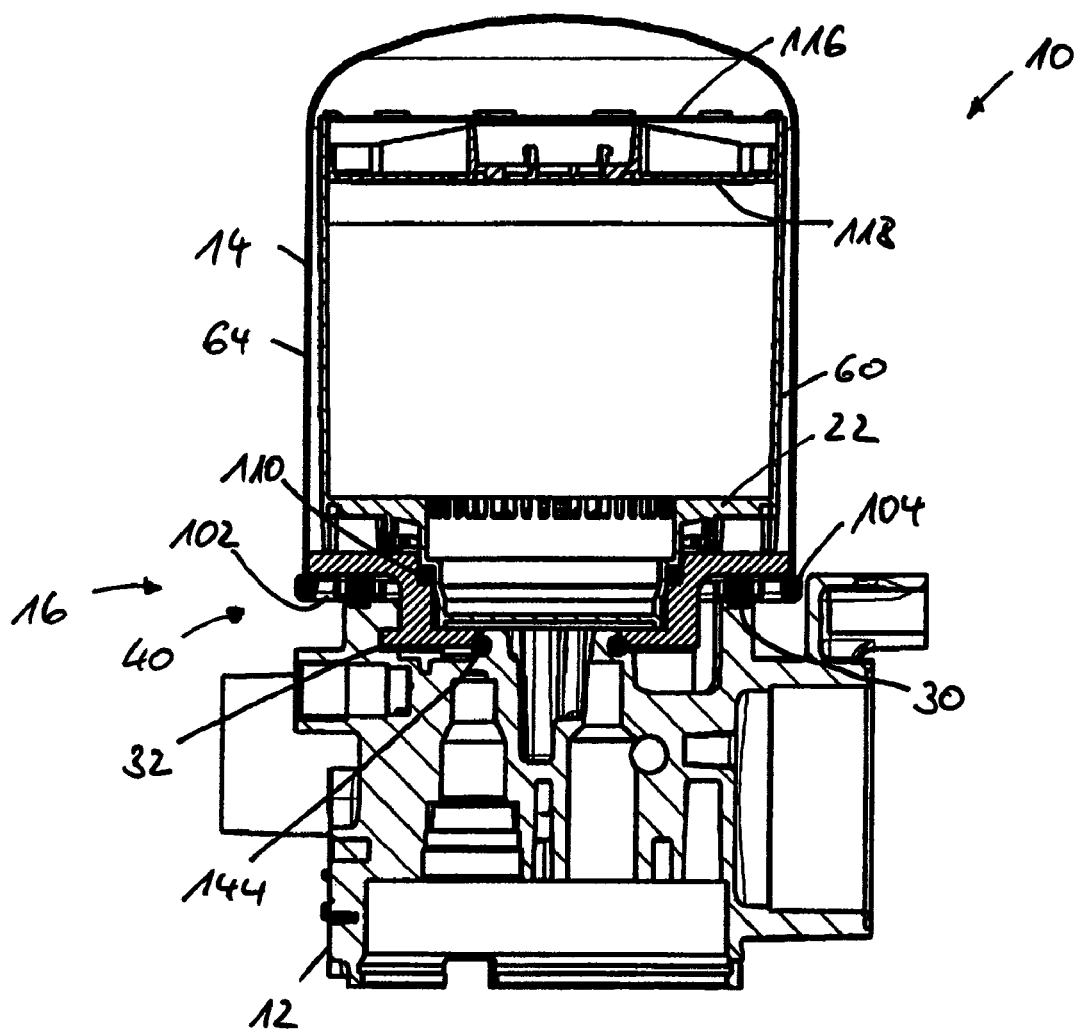

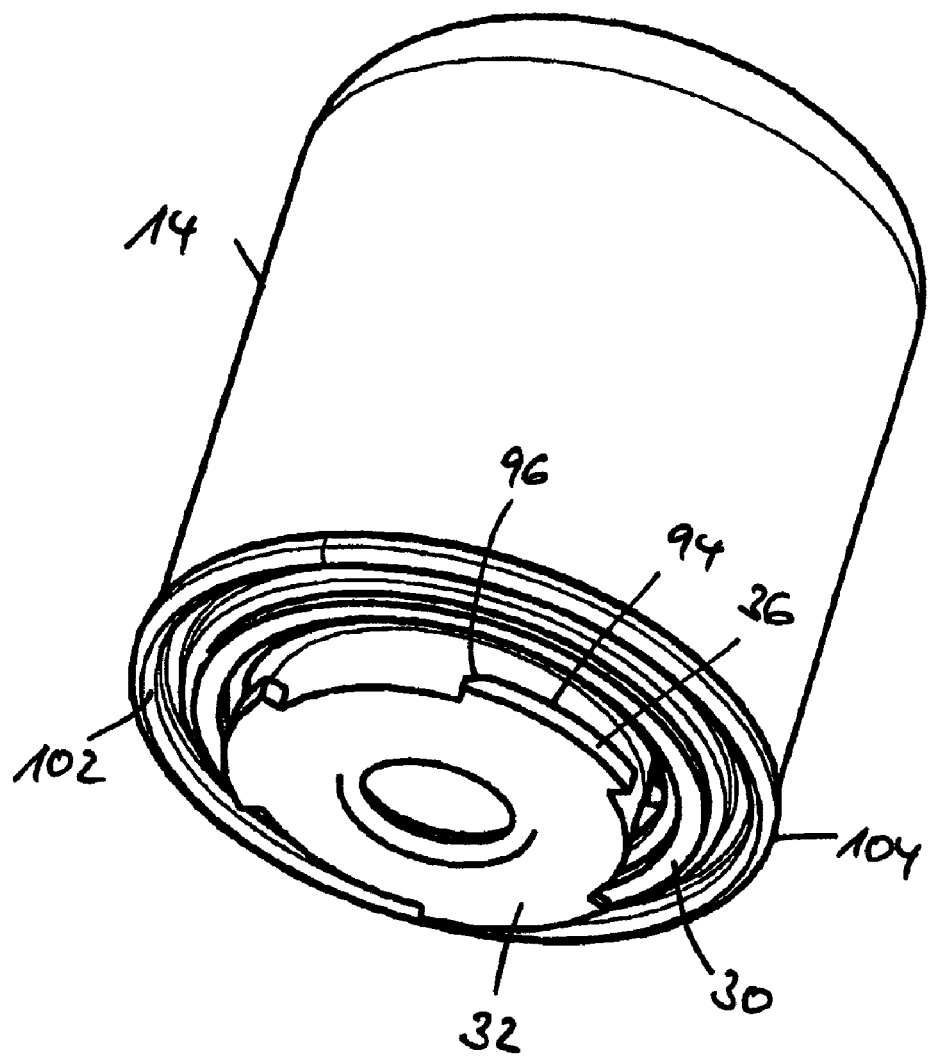

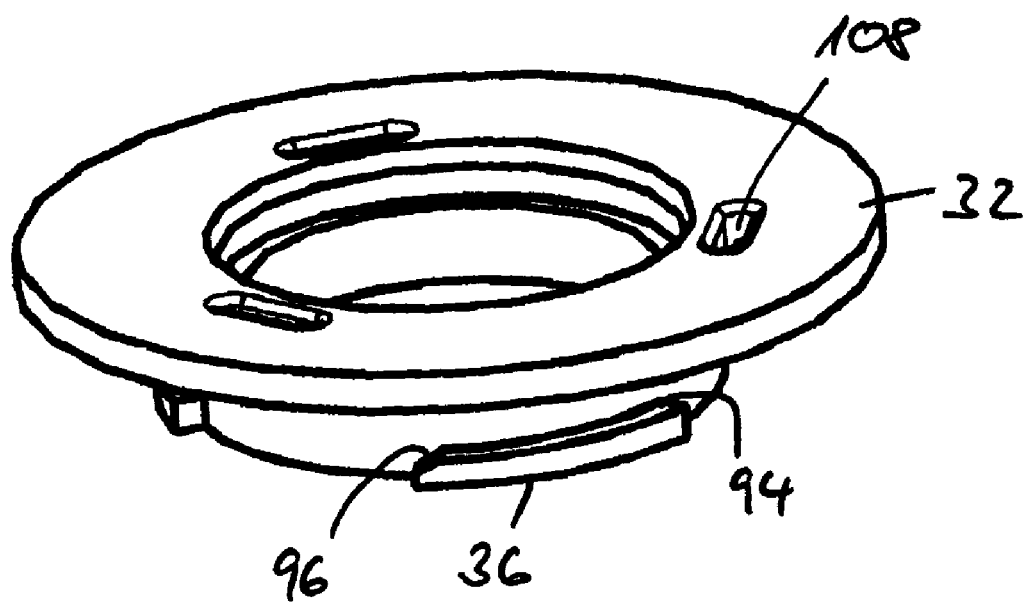

COMPRESSED AIR SUPPLY DEVICE

CROSS-REFERENCE TO RELATED APPLICATIONS

This application is a continuation of PCT International Application No. PCT/EP2007/007026, filed Aug. 8, 2007, and claims priority under 35 U.S.C. §119 to German Patent Application No. DE 10 2006 037 311.1, filed Aug. 8, 2006, the entire disclosures of which are herein expressly incorporated by reference.

This application contains subject matter related to U.S. application Ser. No. 12/366,330, entitled "Compressed Air Supply Device," filed on even date herewith.

BACKGROUND AND SUMMARY OF THE INVENTION

The invention relates to a compressed air supply device for a utility vehicle, having a valve housing and having a substantially axially symmetrical, exchangeable air dryer cartridge which is connected to the valve housing, with the valve housing and the air dryer cartridge being connected to one another by a substantially circular seal which lies in a plane perpendicular to the axis of the air dryer cartridge.

Compressed air supply devices of said type provide treated compressed air to compressed air consumers in utility vehicles. Typical compressed air consumers are for example a pneumatic brake system or an air suspension system. A compressed air supply device combines numerous functions. One important task is that of drying and cleaning the air. For this purpose, an air dryer cartridge is provided which contains filter devices and a drying agent. Other important tasks are those of regulating the pressure of the compressed air provided by a compressor and reliably distributing the compressed air between the different consumer circuits. Said tasks are performed by valve devices which are accommodated in a valve housing, specifically a pressure regulator and a multi-circuit protection valve. Modern compressed air supply devices comprise, in addition to the pneumatic components, an electronic controller and electrically actuable components, for example solenoid valves, and a sensor arrangement which is connected to the electronic controller. The compressed air supply devices which are equipped in this way are also referred to as EAC (Electronic Air Control) systems.

Since the absorption capacity of the air dryer cartridge for foreign substances and humidity is limited, said air dryer cartridge must be regenerated, and ultimately exchanged, at regular intervals and as a function of the delivery capacity of the compressor. It should expediently be possible for the servicing process of exchanging the air dryer cartridge to be carried out by the driver of the utility vehicle himself, that is to say without the aid of a workshop. Consequently, the air dryer cartridges are attached to the valve housing at an easily accessible location by a multi-start thread. If it is necessary for the driver of the utility vehicle to exchange the air dryer cartridge, then it is merely necessary here for the cartridge to be unscrewed, wherein during the unscrewing process, the residual pressure present in the compressed air system can escape without any problems. The new air dryer cartridge can then be connected to the valve housing by the thread.

One problem of the connection type by a thread is that the driver of the utility vehicle must have a sense of how tightly the air dryer cartridge should be screwed to the valve housing. Here, he may be assisted by a tool which is to be carried on-board and which always ensures correct assembly, wherein the carrying of the tool however then constitutes additional expenditure. Furthermore, a certain additional assembly height is required for the threaded connection, which counteracts the general desire to reduce the installation space of vehicle components.

The object on which the invention is based is that of providing a compressed air supply device which, while having a low assembly height, permits fault-free and reliable assembly of the air dryer cartridge, wherein in particular, no tools should be necessary.

The invention builds on the generic compressed air supply device in that the valve housing and the air dryer cartridge can be coupled to one another by being joined together in an axially parallel fashion, and in that the valve housing and the air dryer cartridge have devices which permit a sealed connection between the valve housing and the air dryer cartridge in not all angular positions, defined in relation to the axis of the air dryer cartridge, of the air dryer cartridge with respect to the valve housing. During the assembly, therefore, one is forced to adhere to certain angular positions of the air dryer cartridge with respect to the valve housing. This can facilitate the assembly work. Furthermore, it is possible to ensure, on the basis of coordination of the devices attached to the valve housing and to the air dryer cartridge, that only a suitable air dryer cartridge is placed onto the valve housing. This prevents an incorrect air dryer cartridge from inadvertently being mounted. Furthermore, it is possible to prevent competitors' products, which are not fitted with the corresponding devices, from being used instead of an original product.

Furthermore, it may be provided that the devices comprise an eccentric projection, which is arranged on the valve housing at a distance from the axis, and a recess on the air dryer cartridge, into which recess the projection protrudes in the connected state. A projection of said type, for example in the form of a pin within the seat surface onto which the air dryer cartridge is placed, or a lug on the outer edge of the seat surface, serves to pre-center the air dryer cartridge relative to the valve housing and to prevent the components from rotating relative to one another. The pin or the lug may for example be of such a length that said pins or lugs provide the first contact between the valve housing and the air dryer cartridge during the assembly of the air dryer cartridge.

Furthermore, it may be provided that the projection protrudes into the recess in an at least partially form-fitting manner. By the form-fitting action, the guidance of the air dryer cartridge into the correct position with respect to the valve housing is improved yet further. The projection may in particular be realized as a lug on the outer edge of the surface onto which the air dryer cartridge is placed, with the lug projecting into the recess on the housing of the air dryer cartridge in a form-fitting manner. In addition to its function of preventing rotation, the lug ensures a secure hold of the seal between the compressed air supply device and the air dryer cartridge. If there were no form-fitting action or an insufficient form-fitting action, the seal would not have sufficient hold. It would then not be possible to produce a sealed connection, and the compressed air supply device could not be operated.

It may likewise be provided that the devices comprise toothed regions on the valve housing and on the air dryer cartridge, which toothed regions permit sealed joining-together of the valve housing and filter cartridge only in predefined angular positions. It is possible in this way, too, firstly to define the relative angular position with regard to any functional properties of the air dryer cartridge. Furthermore, it is prevented that air dryer cartridges which do not have a toothing or which have an unsuitable toothing are placed onto the valve housing, as a result of which misassembly is prevented and undesired product piracy is stopped.

It may also be provided that the valve housing and the air dryer cartridge are connected to one another by a bayonet connection. A bayonet connection offers the advantage of an assembly height which is reduced in relation to that of a threaded connection, and the assembly of the air dryer cartridge is simplified in relation to the conventional assembly by a thread.

According to one preferred embodiment, it is provided that the air dryer cartridge and the valve housing have, at least in sections, in each case one substantially radially outwardly extending collar, with sections being formed by at least one of said collars, which sections have an axial collar thickness which increases in the closing direction of the bayonet connection, and in that an outer bayonet ring which is guided by the collars and which can be released from the air dryer cartridge and the valve housing is provided, which outer bayonet ring has a radially inwardly extending collar and, offset in the axial direction with respect thereto, inwardly directed projections, with the axial width of the projections being matched to the variable axial collar thickness in such a way that the bayonet connection can be closed or released by a relative rotation of the outer bayonet ring and the valve housing or air dryer cartridge respectively. An outer bayonet ring is expedient as a connecting element if the valve housing and the air dryer cartridge should have substantially the same radial dimensions.

It is expediently provided that the collar of the valve housing has a plurality of collar sections which extend in the tangential direction and which have an axial collar thickness which increases in the closing direction of the bayonet connection and recesses which are provided between said collar sections, and in that the collar of the air dryer cartridge extends substantially uniformly over the entire periphery and, when the bayonet connection is closed, interacts by a seal with the valve housing. The comparatively thin-walled air dryer cartridge therefore need not have any special design in the region of its collar, while the bevels required for realizing the bayonet connection are realized in the region of the valve housing.

It is preferable if the collar sections at least partially have a stop for limiting the closing rotation of the bayonet connection. As a result of the stop, there is no longer any doubt for the driver, when placing on a new air dryer cartridge, that assembly has been carried out correctly.

According to a further preferred embodiment of the present invention, it is provided that the air dryer cartridge has a substantially radially outwardly extending collar which, in the closed state of the bayonet connection, can be acted on with a force in the axial direction by an inner bayonet ring which surrounds the air dryer cartridge, in that the inner bayonet ring has a radially outwardly extending collar and, offset in the axial direction with respect thereto, outwardly directed projections which have an axial projection thickness which increases in the closing direction of the bayonet connection, and in that a part, which is situated at least partially radially outside the inner bayonet ring, of the valve housing has radially outwardly extending recesses whose axial thicknesses are adapted to the projections of the valve housing in such a way that the bayonet connection can be closed or released by a relative rotation of the inner bayonet ring and the valve housing. The use of an inner bayonet ring is expedient if the valve housing has a larger radius than the air dryer cartridge. The inner bayonet ring is then inserted into the valve housing without taking up further installation space.

As already provided in the case of the outer bayonet ring, it is provided that the projections of the inner bayonet ring at least partially have a stop for limiting the closing rotation of the bayonet connection.

According to a further particularly preferred embodiment of the compressed air supply device according to the invention, it is provided that the bayonet connection has a bayonet ring which has an opening which holds a securing element, with the securing element latching, in the closed state of the bayonet connection, into an opening of the valve housing, via which opening the compressed air supply device can be ventilated by an actuation of the securing element. In addition to the stops which are preferably provided in the bayonet connection and which limit the rotation of the bayonet connection, a latching securing element can offer additional security. The latching can be audibly perceived by the driver. Furthermore, the securing element makes it possible for the compressed air supply device to be ventilated before the opening of the bayonet connection. This is expedient in the case of a connection by a bayonet connection since, otherwise, an abrupt ventilation could take place after a slight opening movement of the bayonet connection, which could sometimes lead to dangerous situations. Since the securing element latches in the closed state of the bayonet connection and thereby prevents the opening movement, it is ensured that a ventilation must always take place, by the actuation of the securing element, before the opening process.

This is realized in structural terms in that the securing element has a lug which is pressed by the force of a spring into the opening of the valve housing, with the lug being movable counter to the spring force in order to ventilate the compressed air supply device and in order to enable the opening movement of the bayonet connection.

Other objects, advantages and novel features of the present invention will become apparent from the following detailed description when considered in conjunction with the accompanying drawings.

BRIEF DESCRIPTION OF THE DRAWINGS

FIG. 3 shows a sectioned view of a part of a compressed air supply device according to an embodiment of the invention with a securing element;

FIG. 4 shows a perspective illustration of an outer bayonet ring an embodiment of;

FIG. 5 shows a plan view of an outer bayonet ring an embodiment of;

FIG. 7 shows a perspective illustration of an inner bayonet ring in accordance with an embodiment of the invention;

FIG. 8 shows a plan view of an inner bayonet ring in accordance with an embodiment of the invention;

FIG. 9 shows a third embodiment of a compressed air supply device according to the invention, in a sectioned illustration;

FIG. 10 shows a perspective illustration of an air dryer cartridge with a foot flange and inner bayonet ring in accordance with an embodiment of the invention;

FIG. 11 shows a perspective illustration of an inner bayonet ring with a foot flange function in accordance with an embodiment of the invention;

DETAILED DESCRIPTION OF THE DRAWINGS

In the following description of the drawings, identical reference symbols are used to denote identical or comparable components.

Figure 1:
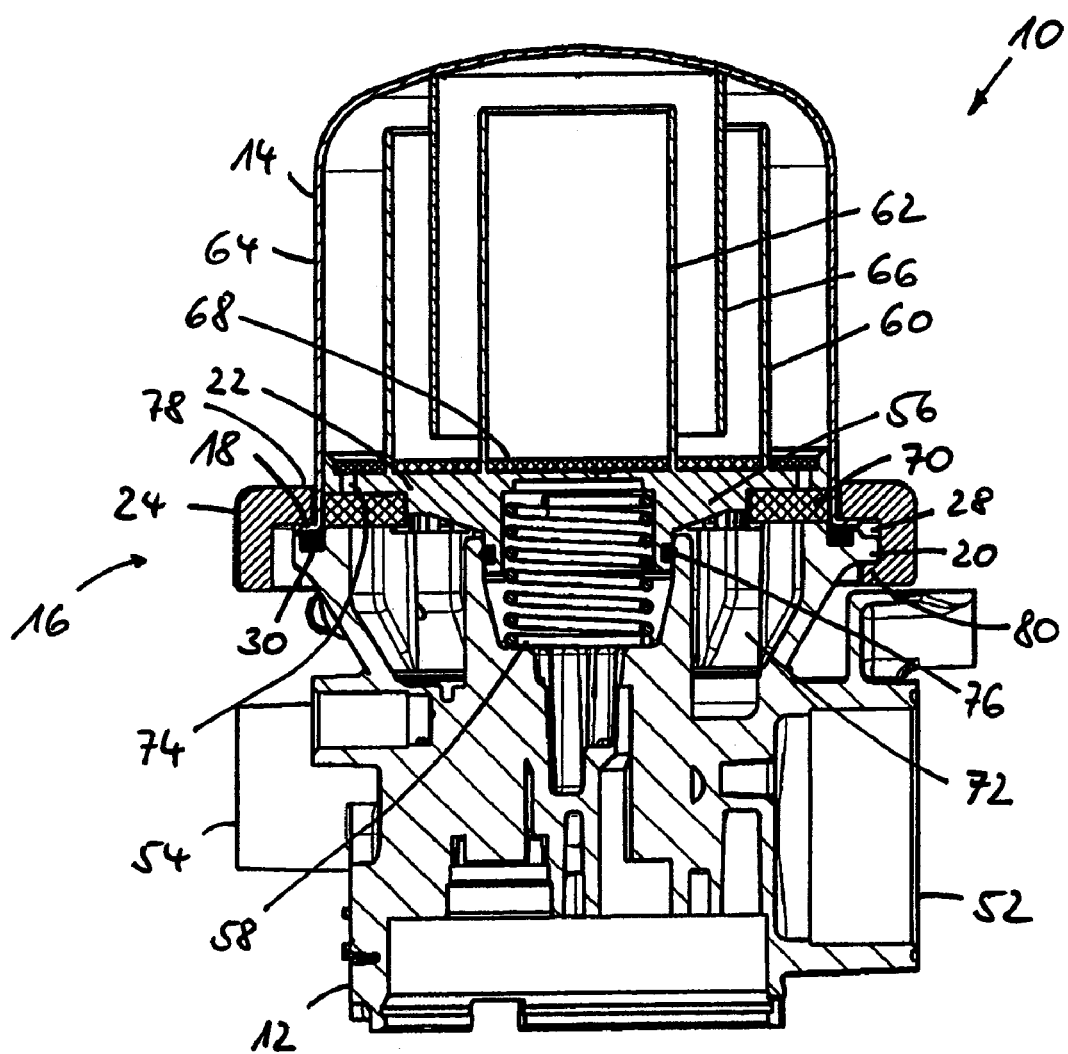
FIG. 1 shows a first embodiment of a compressed air supply device according to the invention in a sectioned illustration.
Figure 2:
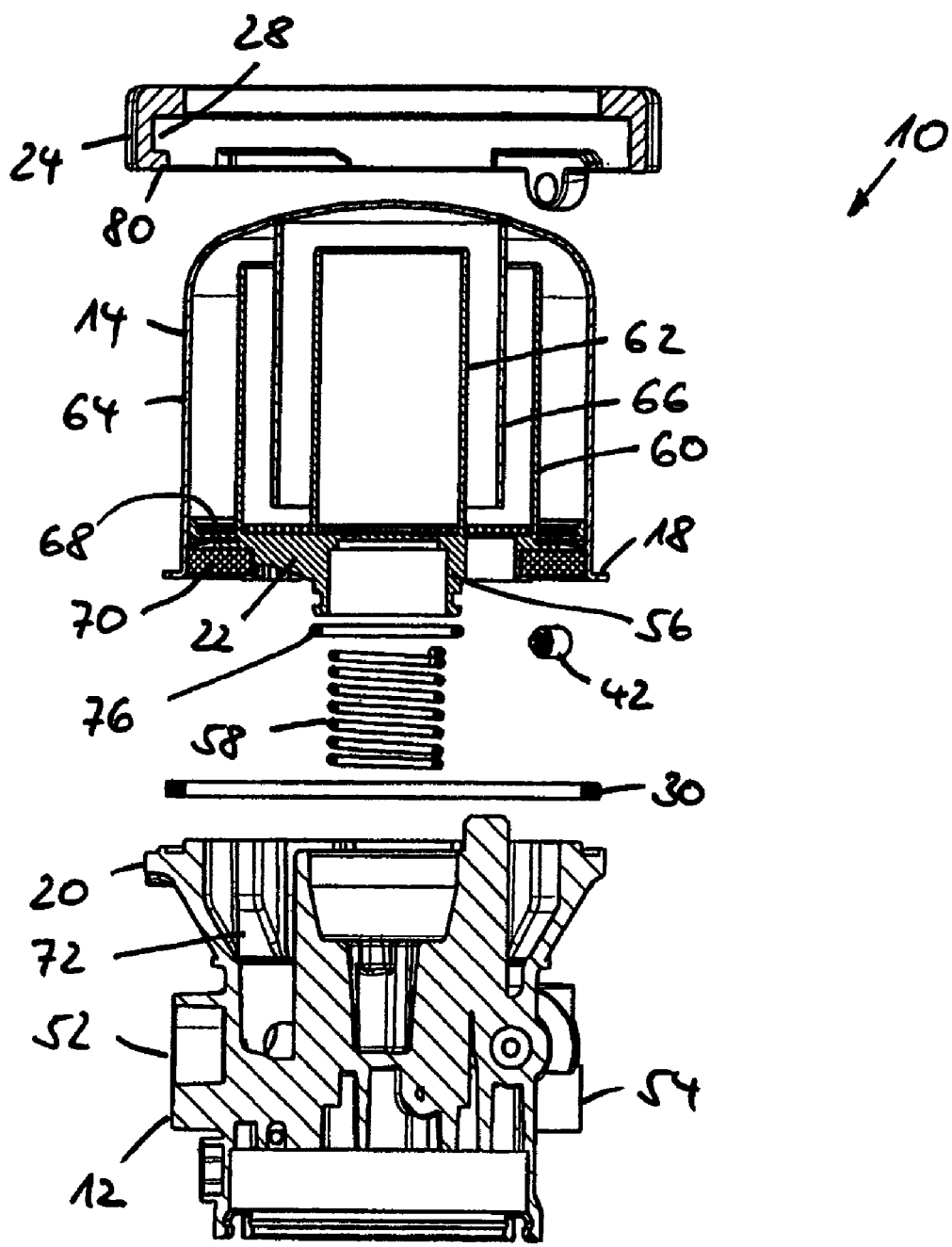
FIG. 2 shows a first embodiment of a compressed air supply device according to the invention in a sectioned exploded illustration.

FIG. 1 shows a first embodiment of a compressed air supply device according to the invention in a sectioned illustration. FIG. 2 shows a first embodiment of a compressed air supply device according to the invention in a sectioned exploded illustration. The compressed air supply device 10 has a valve housing 12 and an air dryer cartridge 14.

The valve housing 12 has an inlet 52 to which a compressor can be connected and via which compressed air which is to be treated can flow in. An outlet 54 for conducting the treated compressed air onward is also provided.

A drying agent box 56 which is preferably composed of plastic is arranged in the air dryer cartridge 14, which drying agent box 56 projects into the valve housing 12 and is supported on the latter via a spring 58. The drying agent box 56 comprises a base 22, an outer tube piece 60 and an inner tube piece 62 which extend into the air dryer cartridge 14. A further tube piece 66, which is fastened to the housing 64 of the air dryer cartridge 14 and which is preferably composed of metal is arranged between the tube pieces 60, 62, which further tube piece 66 is open in the direction of the valve housing 12 while the tube pieces 60, 62 of the drying agent box 56 are open in the opposite direction. The connection of the tube piece 66 to the housing 64 may expediently take place by spot welding, with additional sealing being provided, for example by hardening material. The tube pieces 60, 62, 66 which are arranged one inside the other in this way and the housing 64 serve to form a labyrinth which is filled entirely with granulate for drying the compressed air which flows through the labyrinth. The tight packing of the drying agent in the air dryer cartridge 14 is provided by the force imparted by the spring 58, which force drives the drying agent box 56 into the air dryer cartridge 14. The space filled by drying agent is at least partially delimited in the direction of the valve housing 12 by nonwoven filter 68, wherein the individual regions, which are delimited by the tube pieces 60, 62, 66, of the nonwoven filter 68 may be composed of identical or different materials. In particular, the outer region of the nonwoven filter 68 between the tube piece 60 and the housing 64 of the air dryer cartridge 14 and the central region of the nonwoven filter 68 within the inner tube piece 62 are designed as dust filters, while the nonwoven region arranged between the outer tube piece 60 and the inner tube piece 62 is designed for absorbing and, when required, releasing foreign substances which can emerge out of the drying agent box 56 via non-return valves (see FIG. 17). A pre-filter 70 is also arranged in the region of the lower delimitation of the air dryer cartridge 14, which pre-filter 70 may optionally have the properties of a coalescence filter. The pre-filter 70 serves in particular for cleaning the compressed air with regard to compressor oil and similar contaminants.

Compressed air which flows into the valve housing 12 via the inlet 52 is distributed via ducts in the valve housing 12 in order to then flow via the duct 72 to the pre-filter 70 and pass through the latter. Subsequently, the compressed air flows through the duct 74 and then through the nonwoven filter 68 into the tightly-packed drying agent. The air flows in the air dryer cartridge as far as beyond the open end of the outer tube piece 60 of the drying agent box 56, and is then deflected in order to flow back in the direction of the valve housing 12 between the outer tube piece 60 and the tube piece 66 which is fastened to the housing 64 of the air dryer. After the compressed air has passed the open end of the tube piece 60, said compressed air is again deflected in order to subsequently flow between the tube piece 66, which is fastened to the housing 64 of the air dryer cartridge 14, and the inner tube piece 62, and beyond the end of said tube piece 62. There, the air is again deflected in order to then flow centrally through the inner tube piece 62 and the nonwoven filter 68 and out of the air dryer cartridge 14 and the drying agent box 56, and back into the valve housing 12. The air is collected in the valve housing 12 via ducts and may then be extracted via the outlet 54.

To enable the air guidance described above, it is necessary for the drying agent box 56 to be sealed off with respect to the valve housing 12 by a seal 76 which is designed here as a radially acting seal, in particular as an O-ring. Furthermore, an axially acting seal 30 is provided which seals off a collar 18 of the housing 64 of the air dryer cartridge 14 with respect to the valve housing 12. In order to provide the compression of the seal 30 required for the sealing action, a bayonet connection 16 is provided which holds the valve housing 12 and the air dryer cartridge 14 together. The bayonet connection 16 comprises an outer bayonet ring 24 with inner recesses 28 which are formed in sections and which are formed by projections 80 and a collar 78 which is continuous in the tangential direction. Said inner recesses 28 are suitable for holding collar sections 20 of the valve housing 12 and, with said collar sections 20, imparting an axial force via in each case beveled surfaces by a rotation of the outer bayonet ring 24 with respect to the valve housing 12, which axial force presses the collar 18 of the air dryer cartridge 14 against the valve housing 12 via the seal 30. The collar 78, which is continuous in the tangential direction, of the outer bayonet ring 24 therefore interacts with the collar 18, which is continuous in the tangential direction, of the air dryer cartridge 14, while the collar sections 20 of the valve housing interact with the projections 80 of the outer bayonet ring 24 by the inclined surfaces thereof, and thereby provide the characteristics of a bayonet connection during a relative rotation. In the exploded illustration of FIG. 2, a securing element is also shown which will be explained in more detail with reference to the following figure.

FIG. 3 shows a sectioned view of a part of a compressed air supply device according to the invention with a securing element. The securing element 42 is seated in an opening 44 of the outer bayonet ring 24 and is fixedly connected to the latter there. In the state illustrated in FIG. 3, a lug 48 of the securing element 42 protrudes into an opening 46 of the valve housing, which opening is connected to the compressed air channels in the valve housing 12. The lug 48 of the securing element 42 supports a seal 82 such that, in the illustrated state, an outflow of compressed air is prevented. If the outer bayonet ring 24 is to be rotated with respect to the valve housing 12 in order to open the bayonet connection 16, then it is firstly necessary to pull the securing element 42 outward, out of the opening 46 counter to the force of a spring 50. After the opening 46 is released, the compressed air can then flow out of the system; at the same time, the rotational movement of the outer bayonet ring 24 with respect to the valve housing 12 is enabled. During the closing of the bayonet connection 16, the outer bayonet ring 24 is rotated relative to the valve housing 12 in the closing direction until the lug 48 latches into the opening 46 again and seals the latter off. If the latching-in action is audible, then this simultaneously provides confirmation to the driver that the compressed air supply device 10 has been correctly assembled. Since an opening 46 for the outflow of compressed air is provided only at one peripheral position of the valve housing 12, it must be ensured that the outer bayonet ring 24 can be guided over the collars to be connected to one another only in precisely one position, for example by mechanical guides, in order that the securing element 42 and the opening 46 then also encounter one another during the closing process.

FIG. 4 shows a perspective illustration of an outer bayonet ring. FIG. 5 shows a plan view of an outer bayonet ring. The outer bayonet ring has, on its outer side, a corrugated surface 86 which improves handling during closing and opening. On the inner side of the outer bayonet ring 24, it is possible to see the projecting collar 78, which comes to rest on the collar 18 of the air dryer cartridge 14, and the projections 80 which interact with the sections 20 of the valve housing. It is also possible to see the securing element holder 84. It can be seen in FIG. 4 that the projections 80 increase in thickness from one end region to the other, with a more pronounced run-on bevel also being provided at the thinner end region. The run-on bevel may for example have an inclination of 30°, while the subsequent surface has a gradient of, for example, 1.5°.

Figure 6:
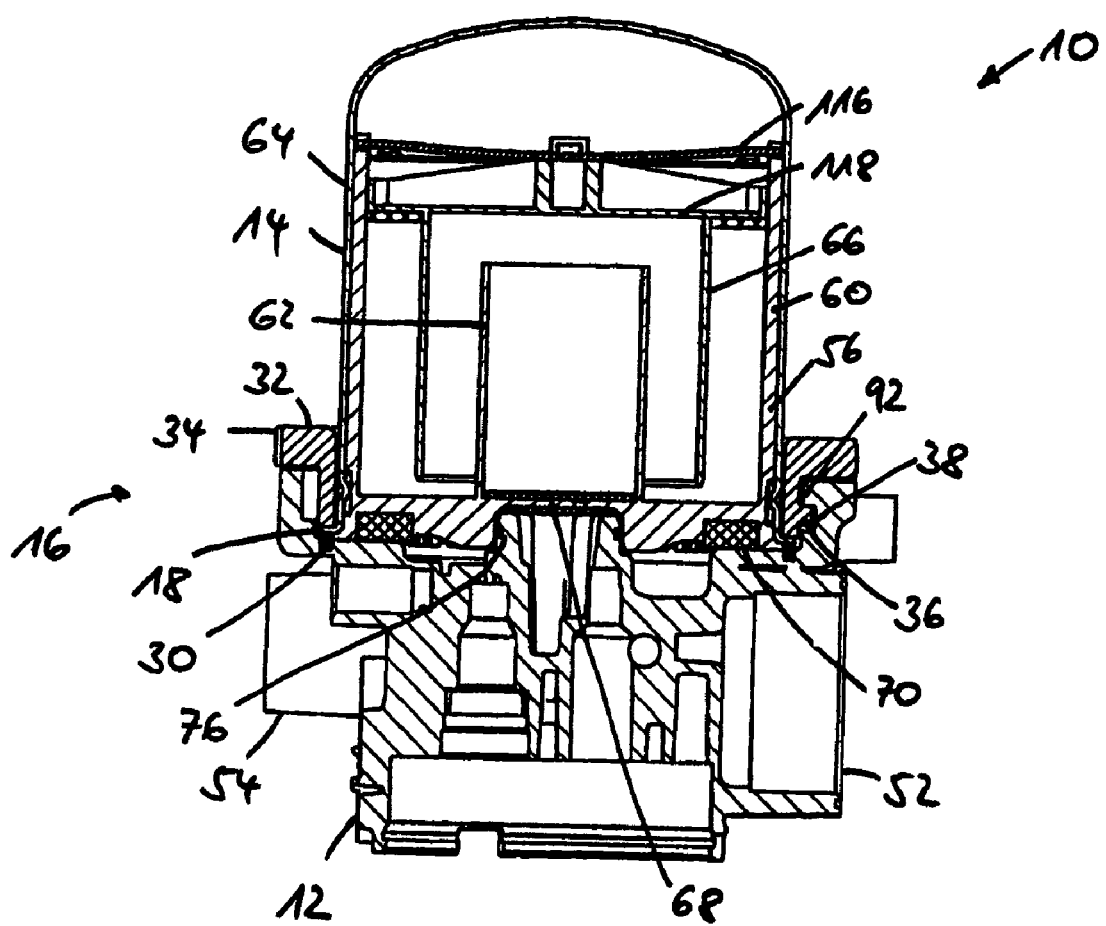
FIG. 6 shows a second embodiment of a compressed air supply device according to the invention, in a sectioned illustration.

FIG. 6 shows a second embodiment of a compressed air supply device according to the invention, in a sectioned illustration. In contrast to the embodiment described above, the bayonet connection 16 which connects the air dryer cartridge 14 to the valve housing 12 comprises an inner bayonet ring 32. The inner bayonet ring 32 is guided over the air dryer cartridge 14 and is rotationally secured with respect to the air dryer cartridge by latching lugs 90 on the inner surface of the inner bayonet ring 32 and corresponding recesses 88 on the housing 64 of said air dryer cartridge. The inner bayonet ring 32 has an outwardly extending collar 34 and outwardly extending projections 36 which are offset axially with respect to said collar 34. The projections 36 have bevels which engage into recesses 38 of a part, which is situated partially outside the inner bayonet ring 32, of the valve housing 12 in order to interact with the radially inwardly extending projections 92 which delimit the recesses 38 at one side. For this purpose, the projections 92 likewise have bevels, which provides a non-positive connection between the projections 92 of the valve housing 12 and the projections 36 of the inner bayonet ring 32 by a relative rotation of the inner bayonet ring 32 and valve housing 12. As a result of the closure of the bayonet connection 16, an axially acting force is generated which acts via the collar 18 of the air dryer cartridge 14 on a seal 30; said seal interacts at the other side with the valve housing 12. A further seal 76 is designed as a radial seal, that is to say in particular as an O-ring. Said seal 76 seals off the valve housing 12 with respect to the drying agent box 56, which is preferably composed of plastic.

With the system which is constructed and sealed in this way, efficient and effective air drying is again possible by virtue of compressed air flowing in via the inlet 52 of the valve housing 12, being distributed via air ducts in the valve housing 12 and flowing via a pre-filter 70, which is preferably designed as a coalescence filter, into the air dryer cartridge 14 or into the drying agent box 56 which is arranged therein. The drying agent box 56 in turn comprises an outer, upwardly open tube piece 60 and an inner, upwardly open tube piece 62. A further tube piece 66 is arranged between the outer tube piece 60 and the inner tube piece 62, which further tube piece 66 is open in the downward direction and is preferably composed of metal. Said metallic tube piece 66 is held by a compression device 118 which is acted on with force by a spring device 116. The granulate which is provided in the drying agent box and which acts as drying agent is tightly packed by said spring force. The air flowing out of the pre-filter 70 flows outside the outer tube piece 60, that is to say between the outer tube piece 60 and the housing 64 of the air dryer cartridge 14, upward through axial ducts (not illustrated) which are arranged between the visible contact regions of the drying agent box 56. To further illustrate said air guidance, reference is made to FIG. 15. The air flows around the open end of the outer tube piece 60, enters into the space, which is free from drying agent, above the compression device 118, and subsequently flows downward between the downwardly open tube piece 66 and the outer tube piece 60 in order to then reverse its flow direction again and flow upward between the inner tube piece 62 and the downwardly open tube piece 66. After another flow reversal, the air to be dried then flows into the inner tube piece 62 in order to then leave the latter in the downward direction through a non-woven filter 68, which acts as a dust filter, into the valve housing 12. Dried air is then discharged via the outlet 54.

The drying agent box 56 and the free region between the drying agent box 56 and the housing 64 are filled entirely with granulate. The latter may be of uniform design. It may also be particularly expedient to introduce different types of drying agent into the drying agent box 56. For example, the drying agent through which flow passes first may be optimized for more moist air, while the drying agent in the outflow region is optimized for the residual dehumidification of already pre-dried air.

FIG. 7 shows a perspective illustration of an inner bayonet ring. FIG. 8 shows a plan view of an inner bayonet ring. The inner bayonet ring 32 has a corrugated outer surface 86 which improves handling during the rotation of the inner bayonet ring 32. The corrugated outer surface is arranged on the outwardly directed collar 34 of the inner bayonet ring 32. Provided axially offset with respect to the collar 34 are projections 36 which are likewise directed outward and which have the inclination, required for the bayonet function, of the surface 94 which faces toward the collar 34. Said inclination may for example be 1.5°. To facilitate the initial rotational movement during the closing of the bayonet connection, run-on bevels 96 are provided which have a considerably greater inclination, for example 30°. The projections 36 may advantageously have a stop in order to limit the closing movement of the bayonet connection. An axial bore 100 is visible on a shoulder 98 on the collar 34, which axial bore 100 has, to receive the securing element 42 described in detail in connection with FIG. 3. During use, the securing element 42 is fixedly seated in said bore 100 so as to then latch with its lug into a bore, which permits the outflow of compressed air out of the compressed air supply device 10, in the valve housing 12. The advantageous combination of a compressed air discharge device and latching device is thereby also provided in combination with the inner bayonet solution.

The embodiments of the present invention described in connection with FIGS. 1 to 8 contain air dryer cartridges which are designed as open systems. This means that the air dryer cartridges seal off directly against the valve housing by a seal, that is to say in particular without an interposed flange.

Figure 12:
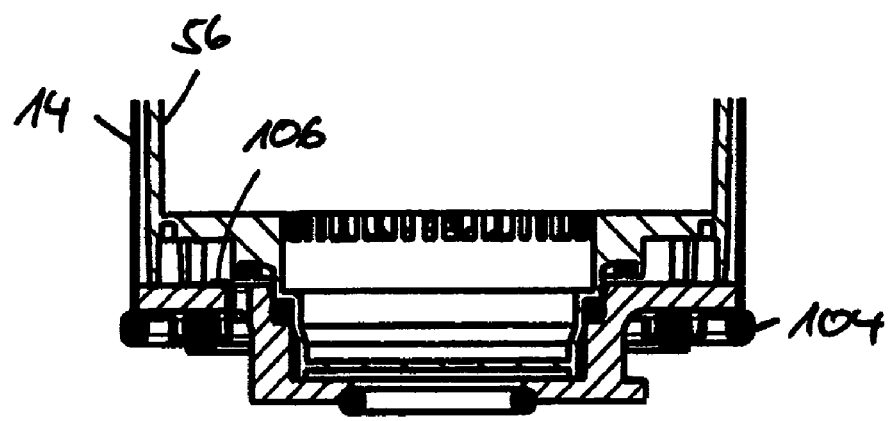
FIG. 12 shows a sectioned view of a part of a compressed air supply device according to an embodiment of the invention for explaining a first form of assembly of a foot flange.
Figure 13:
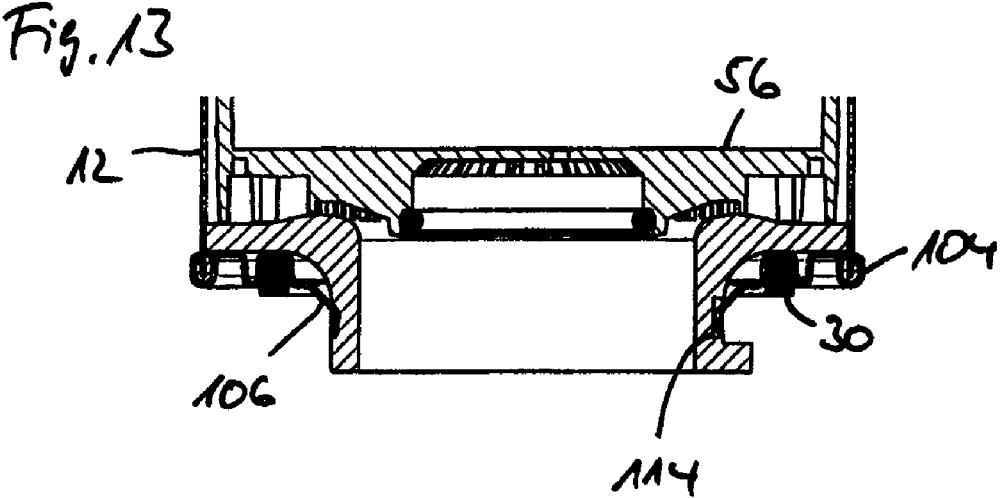
FIG. 13 shows a sectioned view of a part of a compressed air supply device according to an embodiment of the invention for explaining a second form of assembly of a foot flange.

FIG. 9 shows a third embodiment of a compressed air supply device according to the invention, in a sectioned illustration. FIG. 10 shows a perspective illustration of an air dryer cartridge with a foot flange and inner bayonet ring. FIG. 11 shows a perspective illustration of an inner bayonet ring with a foot flange function. FIG. 12 shows a sectioned view of a part of a compressed air supply device according to the invention for explaining a first form of assembly of a foot flange, and FIG. 13 shows a sectioned view of a part of a compressed air supply device according to the invention for explaining a second form of assembly of a foot flange. The system illustrated in said figures has a closed air dryer cartridge 14. Closed air dryer cartridges 14 are those whose housing 64 does not seal off directly against the valve housing 12, but rather a foot flange 40 is provided. The foot flange 40 is combined with an inner bayonet ring 32 which, with regard to its design which provides the bayonet action, is comparable to the inner bayonet ring described in connection with FIGS. 6 to 8. Likewise, the valve housing 12, with regard to the bayonet connection 16, has a similar design to the valve housing 12 described in connection with FIG. 6. The inner bayonet ring 32 is connected by a cover 102 to the housing 64 of the air dryer cartridge 14. The connection of the cover 102 to the housing 64 of the air dryer cartridge takes place by a flanged edge 104. The foot flange 40 interacts via a seal 30, which bears against the cover 102, with the valve housing 12, with the sealing force acting in the axial direction. A further radially acting seal 144 is provided between the valve housing 12 and the inner bayonet ring 32. A radial seal 110 is likewise provided between the drying agent box 56 and the inner bayonet ring 32. The system which is constructed and sealed in this way permits an inflow of compressed air into the inlet 52, a transfer of the compressed air into the region between the drying agent box 56 and the housing 64 of the air dryer cartridge 14, a deflection of the air into the central region, which is filled with drying agent, of the drying agent box 56, and a subsequent outflow of the dried air out of the air dryer cartridge 14 and into the valve housing 12, from which the dried air may then be extracted via the outlet 54. The compression of the drying agent which is present in the drying agent box 56 takes place by a spring device which acts on a compression device 118.

According to FIGS. 11 and 12, the connection of the cover 102 to the inner bayonet ring 32 takes place by the engagement of lugs 106 into openings 108 which are provided for this purpose in the inner bayonet ring 32.

With regard to the fastening of the cover 102 to the inner bayonet ring 32, FIG. 13 shows a variant. Here, lugs 106 do not engage into openings 108 of the inner bayonet ring 32. In fact, said lugs 106 lie in grooves 114 of the inner bayonet ring 32. Said grooves 114 are arranged on the periphery of the inner bayonet ring, in such a way that they do not interfere with the projections required for the bayonet function.

The drying agent box 56 according to FIG. 9 has a fundamentally different design to the drying agent box 56 described in connection with FIGS. 1, 2 and 6. While the latter form a four-channel labyrinth, the drying agent box 56 according to FIG. 9 has no such labyrinthine design. It should be noted that the closed system according to FIG. 9 may likewise easily be combined with a drying agent box 56 with a labyrinthine design like that which is shown in FIGS. 1, 2 and 6. At the same time, the reverse is true, since the use of labyrinthine drying agent boxes is not strictly necessary for the open systems according to FIGS. 1, 2 and 6.

Figure 14:
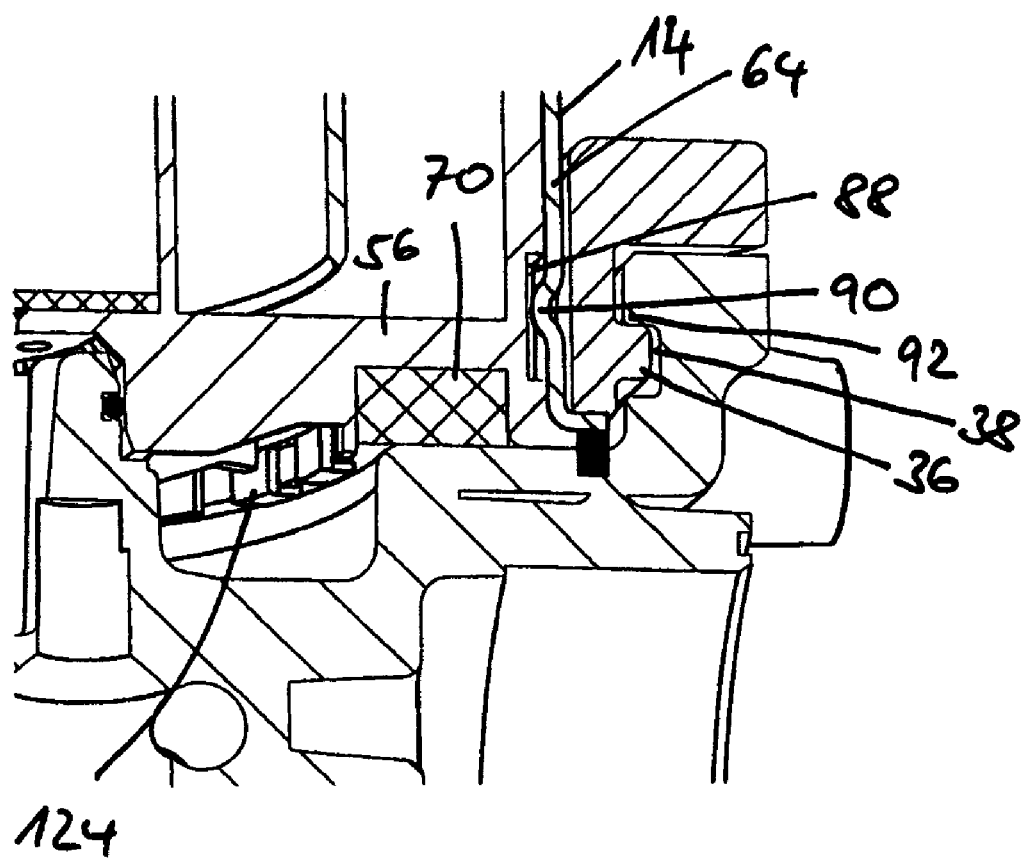
FIG. 14 shows a part of a compressed air supply device according to an embodiment of the invention in a sectioned illustration.

FIG. 14 shows a part of a compressed air supply device according to the invention in a sectioned illustration. In said illustration, it is possible to clearly see the connection between the housing 64 of the air dryer cartridge 14 and the drying agent box 56. A latching lug 90 is arranged in a recess 88. Also shown are holders 124 for holding the pre-filter 70.

Figure 15:
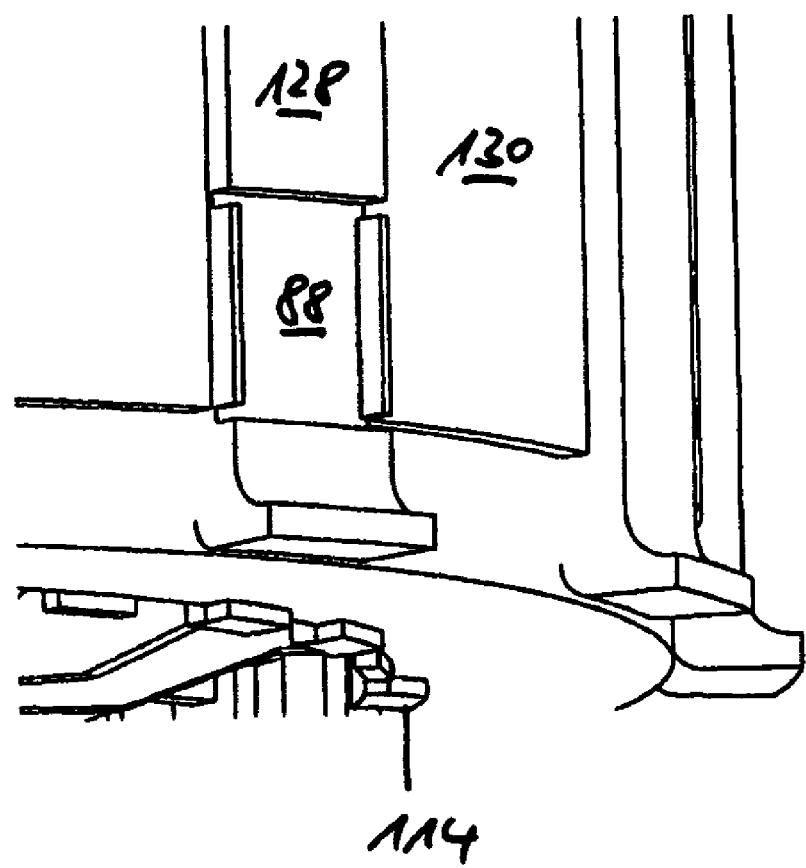
FIG. 15 shows a part of a drying agent box in a perspective illustration in accordance with an embodiment of the invention.

FIG. 15 shows a part of a drying agent box 56 in a perspective illustration. Here, it is likewise possible to see the recesses 88 and the holders 124. It is also possible to see regions 128 which have an increased diameter in relation to adjacent regions 130. When the drying agent box 56 is inserted into the housing 64 of the air dryer cartridge 14, the regions 128 bear against the housing 64. The regions 130 then serve as ducts in order to conduct the compressed air upward as it flows into the air dryer cartridge 14.

Figure 16:
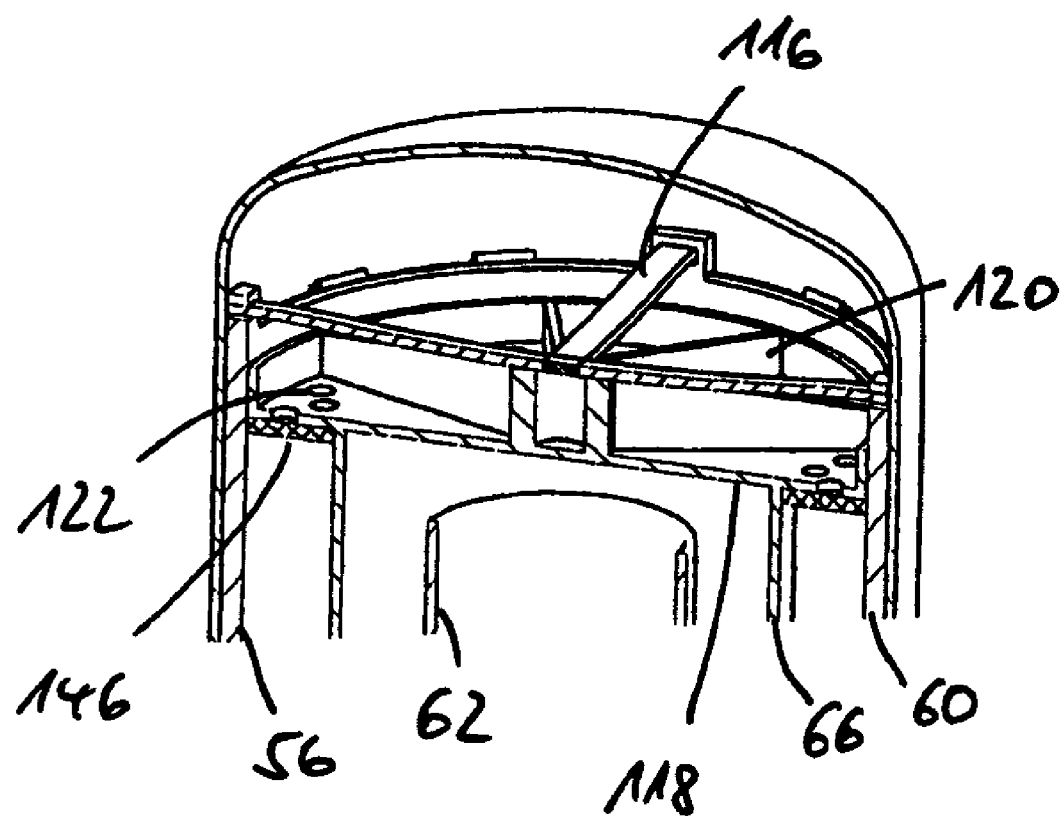
FIG. 16 shows a perspective, sectioned illustration of a part of an air dryer cartridge according to an embodiment of the invention.

FIG. 16 shows a perspective, sectioned illustration of a part of an air dryer cartridge according to the invention. A spring device 116 is fastened to the drying agent box 56, with the connection preferably being realized by injection molding. The spring device 116 is composed of two crossing resilient elements which are connected to one another in the center of the arrangement. There, said resilient elements act downward on a compression device 118 with a force in order to thereby drive the latter into the drying agent box 56. Alternatively, it would for example be possible to provide a centrally arranged spiral spring which is supported on the housing 64 of the air dryer cartridge 14. The compression device 118 is stabilized by a multiplicity of webs 120 and has passage holes 122 which to permit a passage of the air present above the compression device 118 into the duct between the outer tube piece 60, which is a constituent part of the drying agent box 56, and the tube piece 66 which is connected to the compression device 118. A filter 146 is arranged in said duct at the inlet side, which filter 146 is traversed by the air as it enters into the duct.

Figure 17:
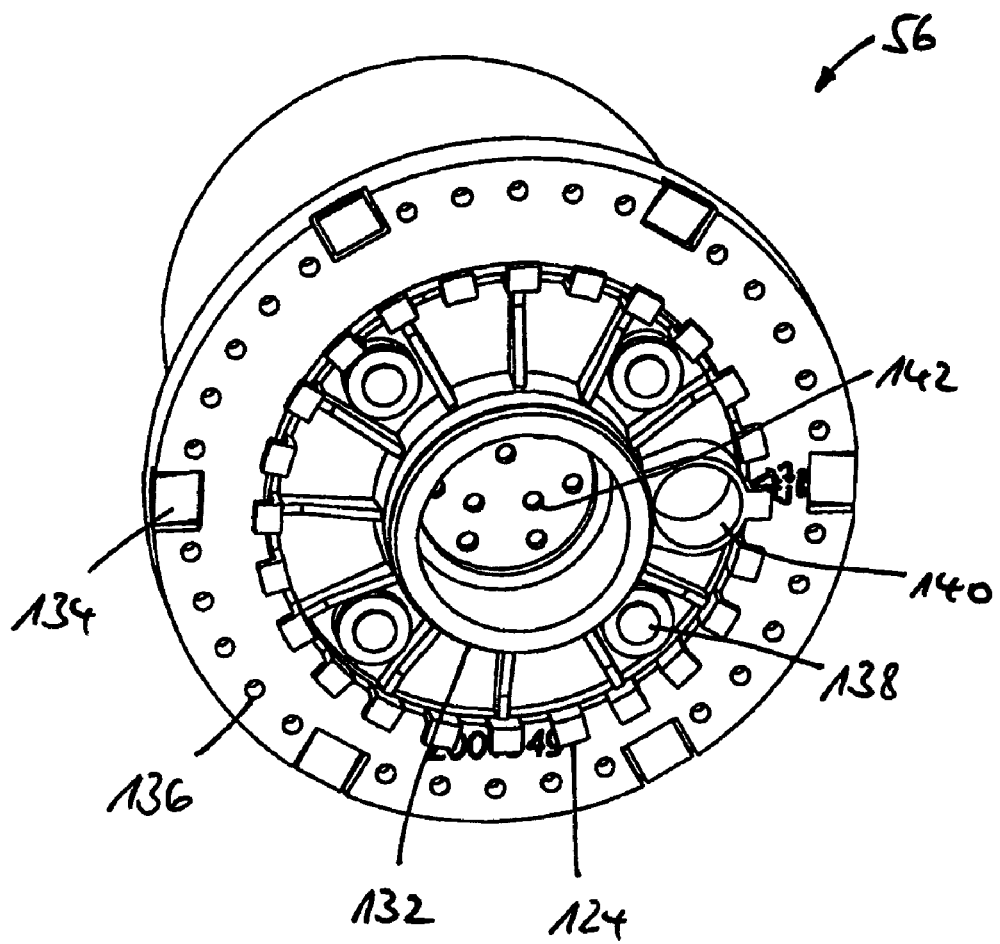
FIG. 17 shows a drying agent box in a perspective illustration according to an embodiment of the invention.

FIG. 17 shows a drying agent box 56 in a perspective illustration. Said drying agent box 56 may for example be used in the in connection with the embodiment of the compressed air supply device 10 according to the invention described on the basis of FIGS. 1 and 2. The spring 58 illustrated in FIG. 1 may project into the central opening 132 of the drying agent box 56 in order to act on the drying agent box 56 with a force in the direction of the air dryer cartridge 14. A plurality of spring lugs 134 are arranged at the periphery of the drying agent box 56, which spring lugs 134 engage in the manner of claws into the housing 64 of the air dryer cartridge 14 and thereby likewise exert an axially upwardly directed force on the drying agent box 56. With a suitable design of the spring lugs 134, it is under some circumstances possible to dispense with the spring 58 which projects into the opening 132, and this facilitates the assembly of the compressed air supply device 10. A multiplicity of openings 136 is provided in the region of the periphery of the drying agent box 56, via which openings 136 the compressed air flows into the drying agent. A multiplicity of openings 142 can be seen within the opening 132, through which openings 142 the compressed air can flow out of the drying agent box 56. Also visible are holders 124 for holding the pre-filter 70. Arranged further inward are non-return valves 138, by which the drying agent box can be flushed. The non-return valves are situated directly below the region which is filled with drying agent, with a nonwoven filter 68 preferably shielding the non-return valves 138 from the drying agent. The drying agent box 56 also has an opening 140. A pin which is connected to the valve housing extends into said opening 140 as the air dryer cartridge 14 is placed onto the valve housing 12. Said pin serves to pre-center the air dryer cartridge 14 relative to the valve housing 12 and to prevent the components from rotating relative to one another. The pin on the valve housing is preferably of such a length that said pin provides the first contact between the valve housing 12 and the air dryer cartridge 14 during the assembly of the air dryer cartridge 14. The opening 140 into which the pin of the valve housing can extend is illustrated here as an opening in the drying agent box. It is likewise possible for an opening of said type or for some other device which acts in a similar way to be provided in a foot flange of an air dryer cartridge, as a result of which the closed systems can also be improved by the present invention.

Figure 18:
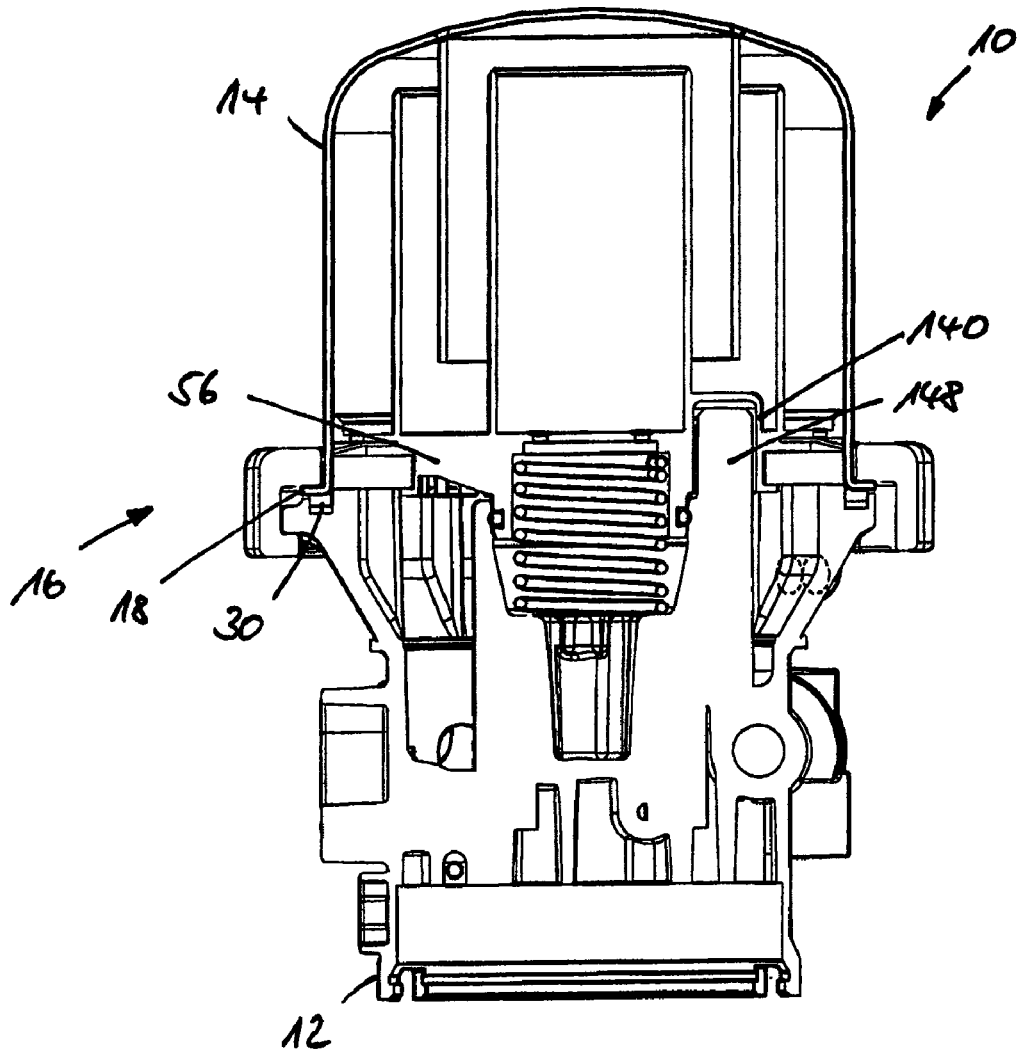
FIG. 18 shows a sectioned view of a compressed air supply device according to an embodiment of the invention.
Figure 19:
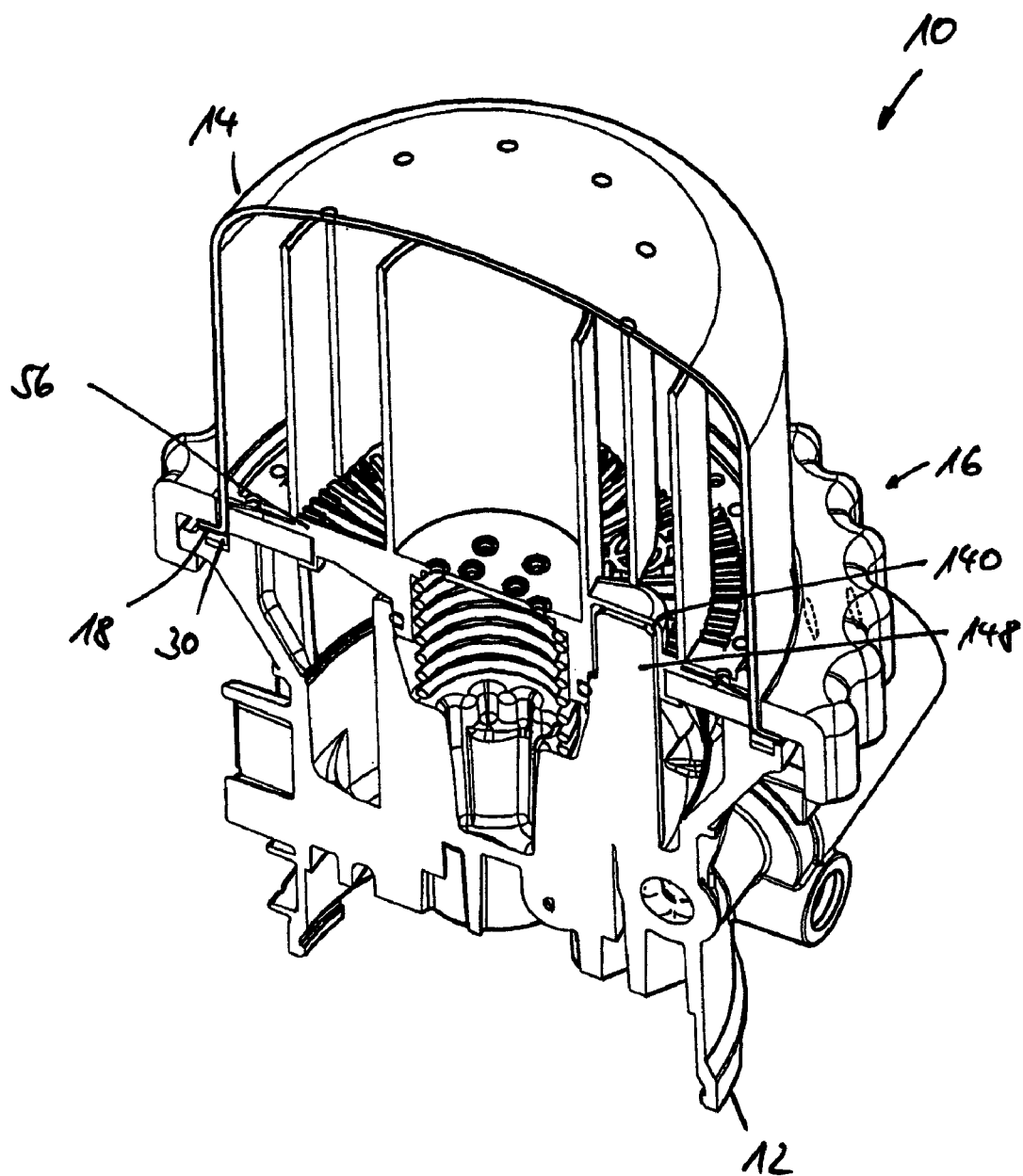
FIG. 19 shows a perspective, sectioned illustration of a compressed air supply device according to an embodiment of the invention.

FIG. 18 shows a sectioned view of a compressed air supply device according to the invention. FIG. 19 shows a perspective, sectioned illustration of a compressed air supply device according to the invention. Here, it is possible to see the pin 148 which is arranged on the valve housing 12. Said pin 148 projects into the opening 140 of the drying agent box 56, as a result of which a form-fitting connection is provided between the valve housing 12 and the air dryer cartridge 14. Since the sealed coupling of the air dryer cartridge 14 to the valve housing 12 is provided by the bayonet connection 16, that is to say in particular without the air dryer cartridge 14 being rotated relative to the valve housing 12, the eccentric connection of the valve housing 12 and air dryer cartridge 14 by the pin 148 and the opening 140 does not hinder the joining-together of the two components. In fact, said devices 148, 140 provide an additional assembly aid during the joining-together process, and the air dryer cartridge 14 is prevented from rotating relative to the valve housing 12. No undesired movement of the collar 18 of the air dryer cartridge 14 over the seal 30 therefore takes place.

Figure 20:
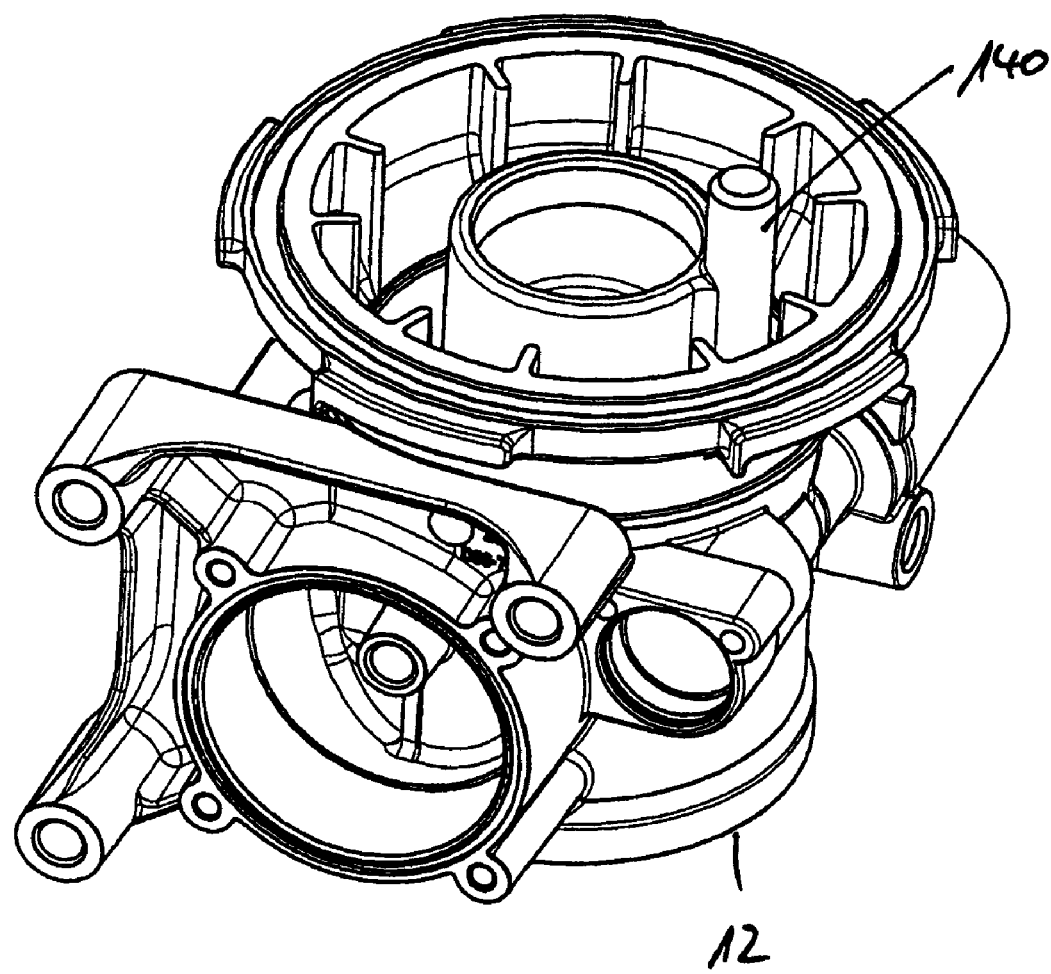
FIG. 20 shows a perspective illustration of a valve housing according to an embodiment of the invention.

FIG. 20 shows a perspective illustration of a valve housing according to the invention. Here, it is possible to see the pin 140 as a projecting component.

Figure 21:
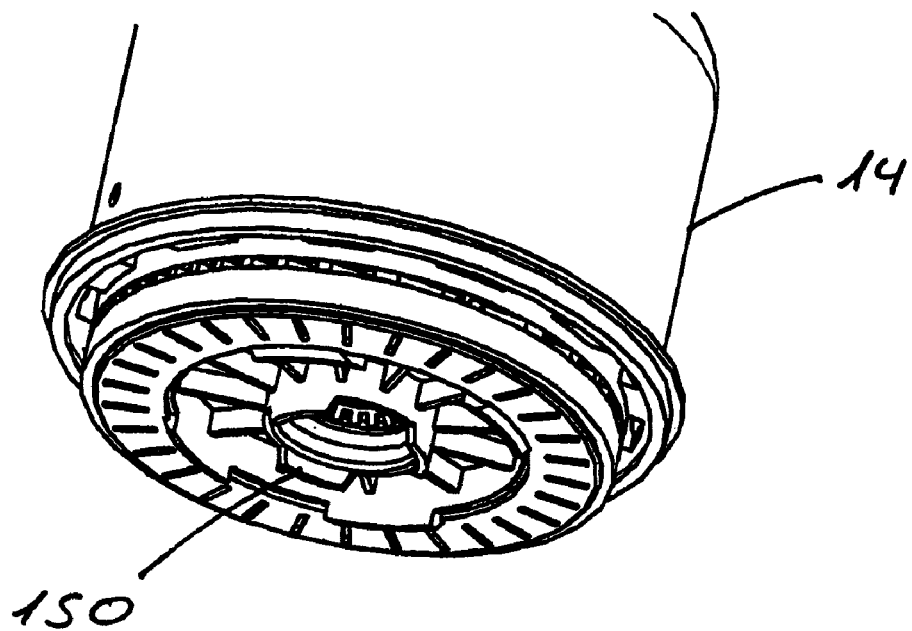
FIG. 21 shows a perspective illustration of a filter cartridge according to an embodiment of the invention.
Figure 22:
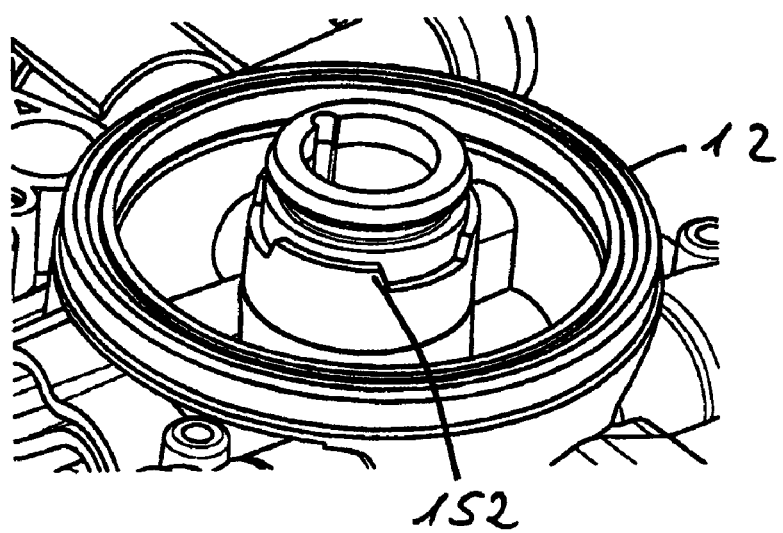
FIG. 22 shows a perspective illustration of a detail of a valve housing according to an embodiment of the invention.
Figure 23:
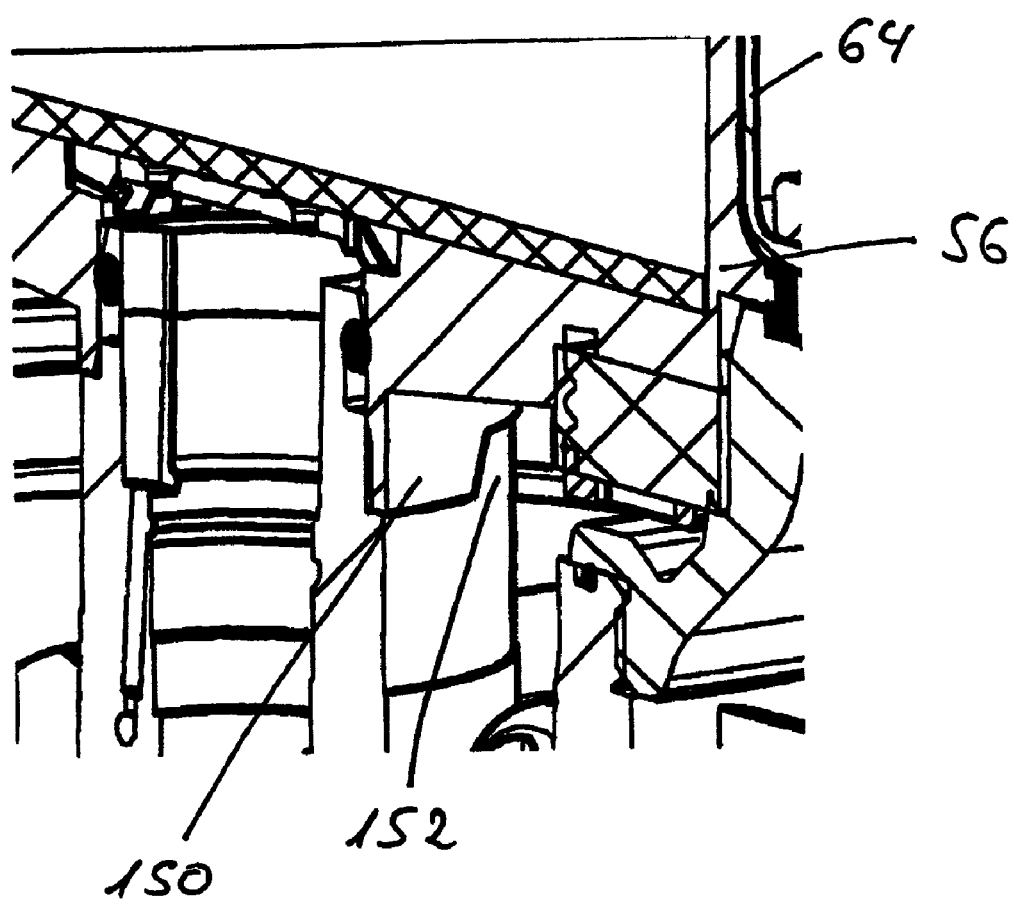
FIG. 23 shows a perspective, sectioned illustration of a part of a compressed air supply device according to an embodiment of the invention.

FIGS. 21, 22 and 23 describe one possibility for the use of a toothing between the air dryer cartridge 14 and the valve housing 12 for pre-centering and rotational locking. The toothing 150 on the air dryer cartridge 14 represents the negative of the toothing 152 on the valve housing 12. If the air dryer cartridge 14 is placed onto the valve housing, said air dryer cartridge 14 cannot be assembled if two teeth of the toothings 150, 152 abut against one another, or if mutually incompatible toothings 150, 152 encounter one another. In this way, assembly is prevented since the spacing between the air dryer cartridge 14 and the valve housing 12 is too large. If the individual teeth of the toothings 150, 152 do not abut against one another, then the spacing between the air dryer cartridge 14 and the valve housing 12 is reduced and assembly becomes possible. If the toothings 150, 152 of the air dryer cartridge 14 and valve housing 12 do not correspond, even though assembly is possible, a leak is generated as a result of the intermediate spaces which are present, which leak can be detected by the compressed air supply device. A similar toothing in the outer region of the valve housing 12 and air dryer cartridge 14 is likewise conceivable and may fulfill the same purpose.

Figure 24:
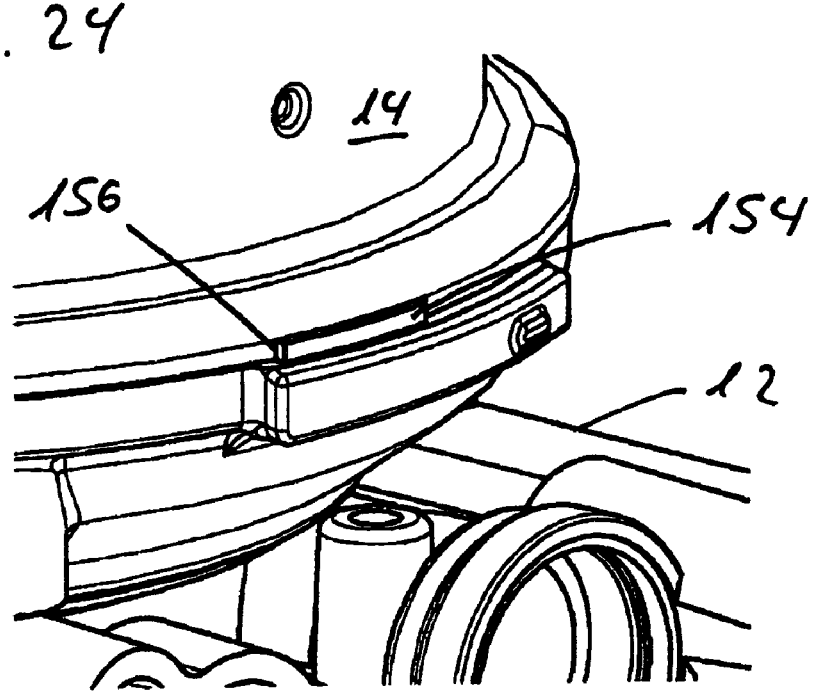
FIG. 24 shows a perspective illustration of a detail of a compressed air supply device according to an embodiment of the invention.
Figure 25:
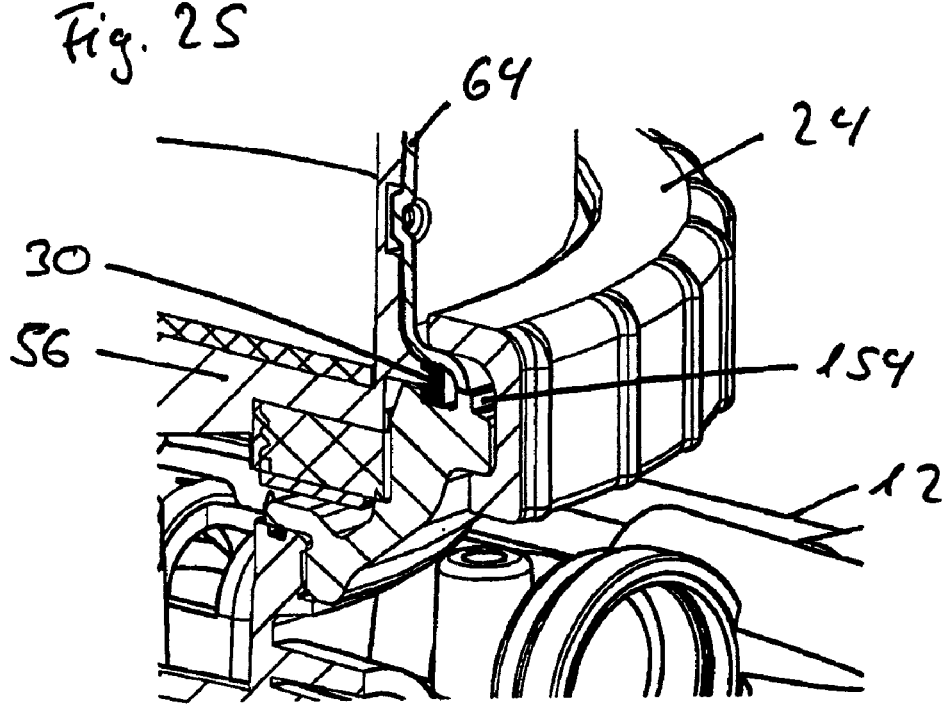
FIG. 25 shows a perspective, sectioned illustration of a compressed air supply device according to an embodiment of the invention.

FIGS. 24 and 25 show a compressed air supply device according to the invention in which a lug 154 and a recess 156 is provided on the outer edge of the seat surface. The recess 156 is arranged in the housing 64 of the air dryer cartridge 14 in such a way that said recess 156 partially exposes the seal 30. If the valve housing 12 does not have a lug 154 which is suitable for the recess 156, the seal 30 is partially exposed after the assembly of the air dryer cartridge. A leak is then generated as a result of the seal 30 being acted on with pressure as the compressed air supply device 10 is set in operation, since the seal 30 cannot be supported either by the housing 64 of the air dryer cartridge 14 or by the lug 154 in the exposed region. In the reverse case, in which the air dryer cartridge 14 does not have a recess 156, assembly cannot be carried out since the lug 154 which is provided on the valve housing 12 holds the air dryer cartridge 14 at a distance. The compressed air supply device can therefore be set in operation only with an air dryer cartridge 14 which has a recess 156 which is adapted to the lug 154 attached to the valve housing 12. It is likewise conceivable for a plurality of lugs 154 and associated recess 156 to be used simultaneously.

Figure 26:
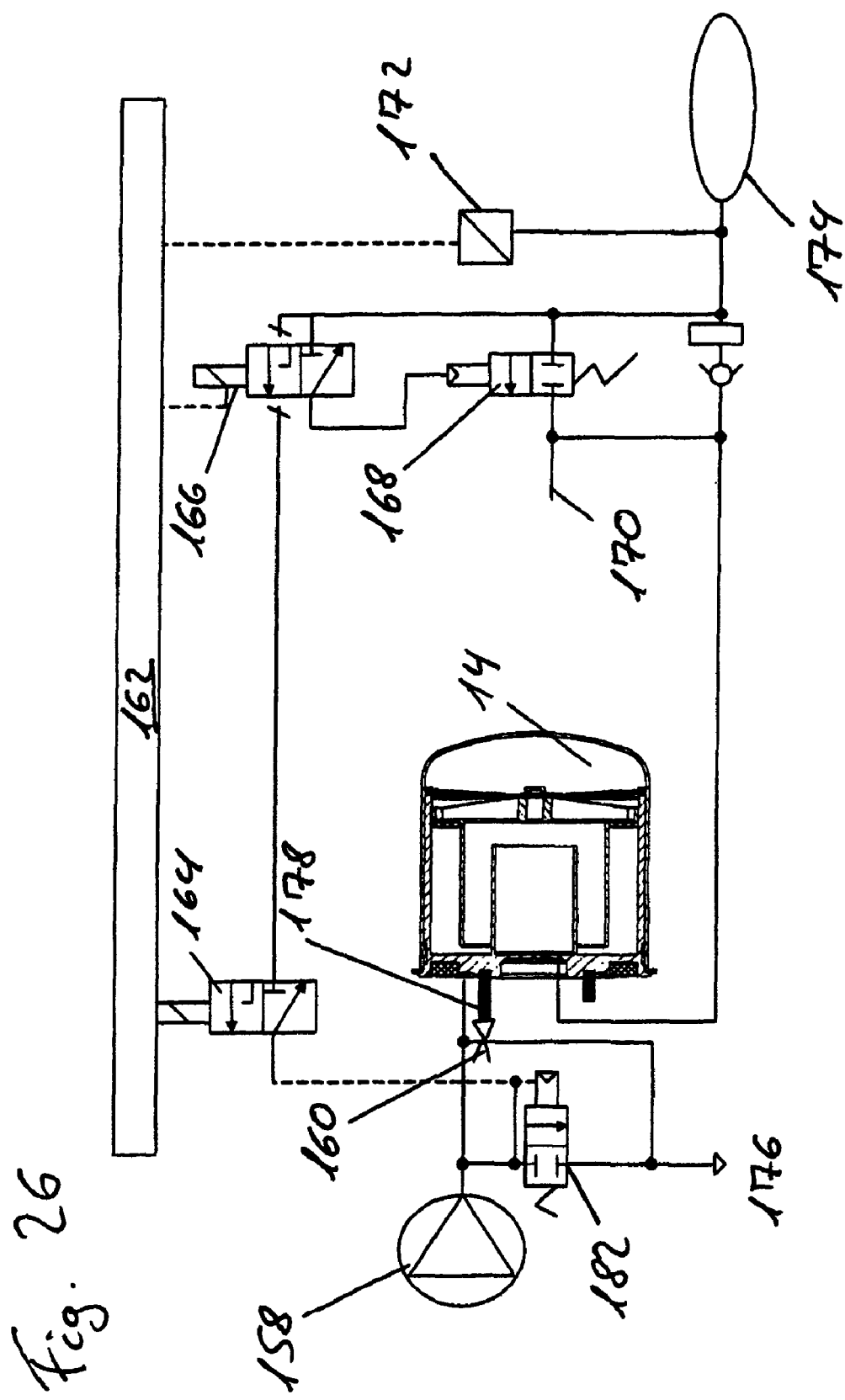
FIG. 26 shows a schematic illustration of a further embodiment of a compressed air supply device according to an embodiment of the invention.
Figure 27:
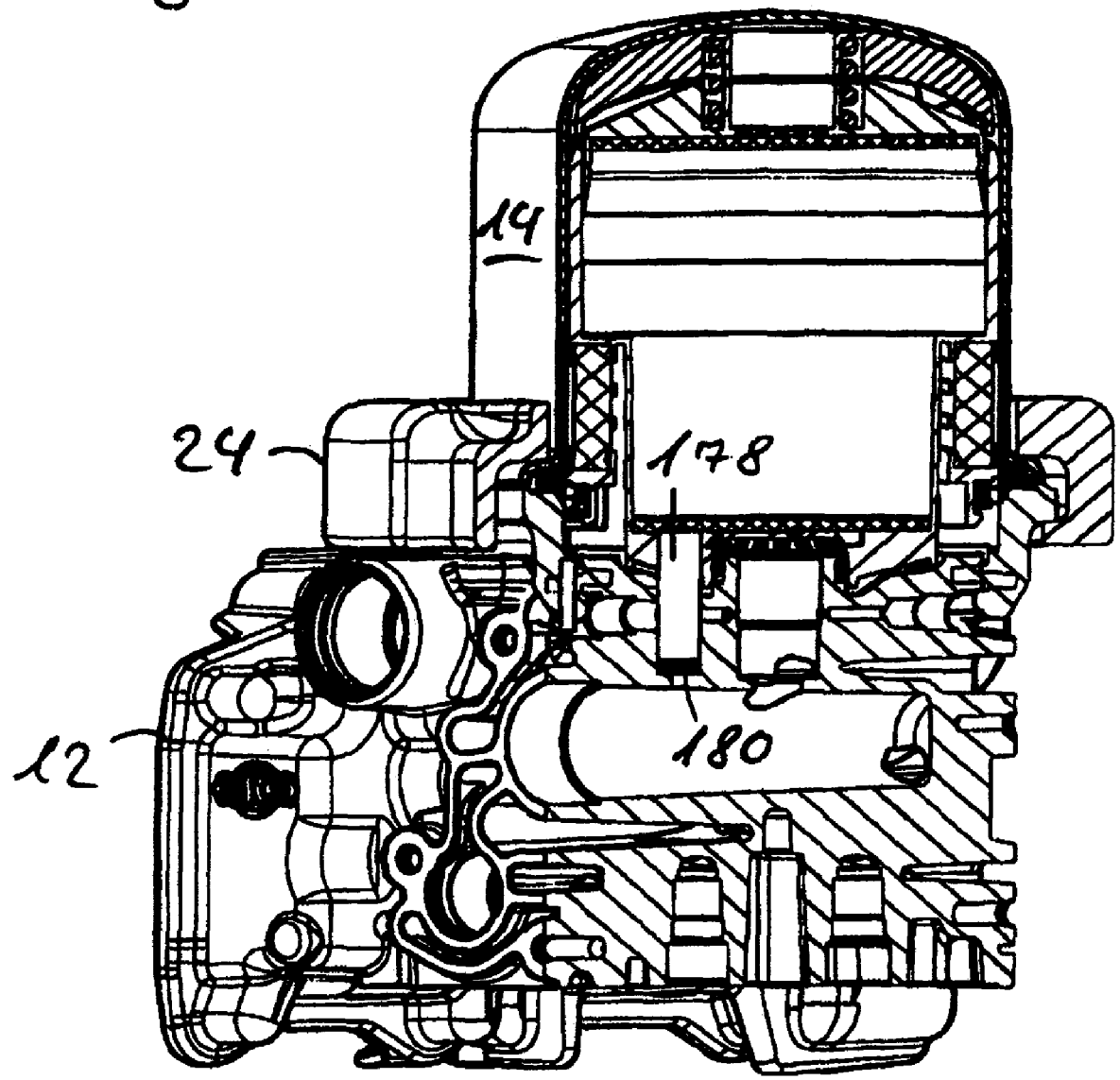
FIG. 27 shows a perspectively sectioned illustration of a further embodiment of a compressed air supply device according to an embodiment of the invention.

FIGS. 26 and 27 show illustrations of a further embodiment of a compressed air supply device according to the invention. The schematically simplified illustration of the compressed air supply system in FIG. 26 comprises a compressor 158, an ECU 162 for controlling the system, a solenoid valve 164 which is used as a pressure regulator, a solenoid valve 166 which is used as a regeneration valve, a booster valve 168, a pressure sensor 172, a reservoir/consumer 174, an air filter cartridge 14 and a vent 176 which, by a blockable throttle 160, produces a connection with a pin with a rubber valve seat 178. Also provided is a blow-off valve 182 which is required for the regeneration of the air dryer cartridge 14.

In contrast to the preceding embodiments, in this embodiment, the setting of the compressed air supply device in operation is prevented by the design of the pin 178 itself. The pin is hollow and has, at one end, a rubber valve seat which is coupled to a ventilation bore and which operates as a 2/2 directional control valve. The ventilation bore in turn provides a connection to the ventilation device of the compressed air supply system. That is to say that, in the event of a leak in the connection between the pin 178 and the recess which receives the latter, a pressure build-up in the compressed air supply device is prevented by the ventilation opening 180, since the rubber valve seat is then not closed. This usually occurs only if an incorrect, that is to say mechanically unsuitable, air filter cartridge 14 is to be installed. Since the pressure loss is realized by the ventilation device 176 of the compressed air supply device, this embodiment operates considerably more quietly during the dissipation of pressure than the preceding embodiment.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

TABLE OF REFERENCE SYMBOLS

10 Compressed air supply device
12 Valve housing
14 Air dryer cartridge
16 Bayonet connection
18 Collar
20 Collar section
22 Base
24 Outer bayonet ring
28 Recess
30 Seal
32 Inner bayonet ring
34 Collar
36 Projection
38 Recess
40 Foot flange
42 Securing element
44 Opening
46 Opening
48 Lug
50 Spring
52 Inlet
54 Outlet
56 Drying agent box
58 Spring
60 Outer tube piece
62 Inner tube piece
64 Housing
66 Tube piece
68 Filter nonwoven
70 Pre-filter
72 Duct
74 Duct
76 Seal
78 Collar
80 Projection
82 Seal
84 Securing element holder
86 Corrugated surface
88 Recess
90 Latching lug
92 Projection
94 Surface
96 Run-on bevel
98 Shoulder
100 Bore
102 Cover
104 Flanged edge
106 Lug
108 Opening
110 Radial seal
114 Groove
116 Spring device
118 Compression device
120 Web
122 Passage hole
124 Holder
128 Region
130 Region
132 Opening
134 Spring lug
136 Opening
138 Non-return valve
140 Opening
142 Opening
144 Seal
146 Filter
148 Pin
150 Toothing on air dryer cartridge
152 Toothing on valve housing
154 Lug
156 Recess
158 Compressor
160 Blockable throttle point
162 ECU
164 Solenoid valve/pressure regulator
166 Solenoid valve/regeneration valve
168 2/2 directional control valve/booster valve
170 ESS connection
172 Pressure sensor
174 Reservoir/consumer
176 Vent
178 Pin with rubber valve seat
180 Ventilation bore
182 Blow-off valve

What is claimed is:

1. A compressed air supply device for a utility vehicle, comprising:
    a valve housing; and
    a substantially axially symmetrical, exchangeable air dryer cartridge,
    wherein the air dryer cartridge is connected to the valve housing with a substantially circular seal which lies in a plane perpendicular to an axis of the air dryer cartridge arranged between the air dryer cartridge and the valve housing,
    the valve housing and the air dryer cartridge are arranged to be coupled to one another by being joined together in an axially parallel manner,
    the valve housing and the air dryer cartridge have at least one feature which permits a sealed connection between the valve housing and the air dryer cartridge in a predetermined number of angular positions of the air dryer cartridge relative to the valve housing, the predetermined number of angular positions not including all angular positions about the axis of the air dryer cartridge,
    the at least one feature includes an eccentric projection arranged on the valve housing at a distance from a central axis of the valve housing protruding parallel to the central axis from within the coupling surface enclosed by the substantially circular seal, and
    a recess on the air dryer cartridge arranged to receive the eccentric projection when the valve housing and the air dryer cartridge are in a connected state.

2. The compressed air supply device as claimed in claim 1, wherein when in the connected state, the projection protrudes into the recess in an at least partially form-fitting manner.

3. The compressed air supply device as claimed in claim 1, wherein
the at least one feature further includes corresponding toothed regions on the valve housing and on the air dryer cartridge, and
the toothed regions are arranged to permit sealed joining-together of the valve housing and filter cartridge only in predefined angular positions.

4. The compressed air supply device as claimed in claim 1, wherein
the valve housing and the air dryer cartridge are connected to one another by a bayonet connection.

5. The compressed air supply device as claimed in claim 4, wherein
the air dryer cartridge and the valve housing each have, at least in portions, a substantially radially outwardly extending collar,
at least one of the collars has interrupted collar sections,
at least one of the interrupted collar sections has an axial collar thickness which increases in the closing direction of the bayonet connection, and
the compressed air supply device further comprising:
an outer bayonet ring, wherein the outer bayonet ring
is guided by at least one of the collars and is releasable from the air dryer cartridge and the valve housing,
has a radially inwardly extending collar and, offset in an axial direction, radially inwardly directed projections having an axial width corresponding to the at least one interrupted sections such that rotation of the outer bayonet ring relative to at least one of the valve housing and air dryer cartridge permits the bayonet connection to be released.

6. The compressed air supply device as claimed in claim 5, wherein
the collar of the valve housing has a plurality of interrupted collar sections which extend in a tangential direction and have an axial collar thickness which increases in the closing direction of the bayonet connection,
recesses which are provided between the interrupted collar sections, and
the collar of the air dryer cartridge extends substantially uniformly around the cartridge periphery and is sealed by a seal between the air dryer cartridge collar and the valve housing when the bayonet connection is closed.

7. The compressed air supply device as claimed in claim 6, wherein
at least one of the interrupted collar sections has a stop for limiting the closing rotation of the bayonet connection.

8. The compressed air supply device as claimed in claim 4, wherein
the air dryer cartridge has a substantially radially outwardly extending collar which when in a closed state of the bayonet connection, is acted on with a force in the axial direction by an inner bayonet ring which surrounds the air dryer cartridge,
the inner bayonet ring has a radially outwardly extending collar and, offset in the axial direction with respect thereto, outwardly directed projections having an axial projection thickness which increases in the closing direction of the bayonet connection, and
the inner bayonet ring has a part situated at least partially radially outside an inner bayonet ring of the valve housing, the part having radially outwardly extending recesses whose axial thicknesses are adapted to projections of the inner bayonet ring of the valve housing such that of the inner bayonet ring relative to at least one of the valve housing and air dryer cartridge permits the bayonet connection to be released.

9. The compressed air supply device as claimed in claim 8, wherein
at least one of the projections of the inner bayonet ring has a stop for limiting the closing rotation of the bayonet connection.

10. The compressed air supply device as claimed in claim 5, wherein
the bayonet connection has a bayonet ring which has an opening to receive a securing element in a closed state of the bayonet connection which enters an opening of the valve housing, and
when the securing element is actuated in the valve housing opening, the compressed air supply device is ventilated.

11. The compressed air supply device as claimed in claim 10, wherein
the securing element has a lug which is urged by a spring force into the valve housing opening, the lug being movable counter to the spring force in order to ventilate the compressed air supply device and to enable opening of the bayonet connection.

12. A valve housing for a compressed air supply device, wherein
the valve housing is arranged to be releasably connected to a substantially axially symmetrical air dryer cartridge,
the valve housing and the air dryer cartridge are arranged to be connected to one another in an axially parallel manner,
the valve housing and the air dryer cartridge have at least one feature which permits a sealed connection between the valve housing and the air dryer cartridge in a predetermined number of angular positions of the air dryer cartridge relative to the valve housing, the predetermined number of angular positions not including all angular positions about the axis of the air dryer cartridge,
the at least one feature of the valve housing includes an eccentric projection protruding parallel to the central axis from within the coupling surface enclosed by the substantially circular seal.

13. The valve housing as claimed in claim 12, wherein
the at least one feature of the valve housing further includes a toothed region.

14. A substantially axially symmetrical air dryer cartridge for a compressed air supply device, wherein
the substantially axially symmetrical air dryer cartridge is arranged to be releasably connected to a valve housing,
the valve housing and the air dryer cartridge are arranged to be connected to one another in an axially parallel manner,
the valve housing and the air dryer cartridge have at least one feature which permits a sealed connection between the valve housing and the air dryer cartridge in a predetermined number of angular positions of the air dryer cartridge relative to the valve housing, the predetermined number of angular positions not including all angular positions about the axis of the air dryer cartridge, and
the at least one feature of the valve housing includes an eccentric recess arranged to receive a corresponding eccentric projection protruding parallel to the central axis from within the coupling surface enclosed by the substantially circular seal at the valve housing when the valve housing and the air dryer cartridge are in a connected state.

15. The air dryer cartridge as claimed in claim 14, wherein the at least one feature of the valve housing further includes a toothed region.

16. A method of assembling a compressed air supply device for a utility vehicle, comprising:
aligning a valve housing adjacent to an air dryer cartridge;
engaging at least one feature of the valve housing and the air dryer cartridge with a corresponding feature of the other of the valve housing and the air dryer cartridge in one of a predetermined number of angular positions of the air dryer cartridge relative to the valve housing, the predetermined number of angular positions not including all angular positions about the axis of the air dryer cartridge, wherein
the at least one feature of the valve housing comprises a projection protruding parallel to the central axis from within the coupling surface enclosed by the substantially circular seal, and
the at least one feature of the filter cartridge comprises a recess corresponding to the projection; and
securing the valve housing and the air dryer cartridge to one another by rotation of a bayonet ring relative to the valve housing and the air dryer cartridge.

17. The method of claim 16, wherein
the air dryer cartridge and the valve housing each have, at least in portions, a substantially radially outwardly extending collar,
at least one of the collars has interrupted collar sections,
at least one of the interrupted collar sections has an axial collar thickness which increases in the closing direction of the bayonet connection, and
the compressed air supply device further comprising:
an outer bayonet ring having a radially inwardly extending collar and, offset in an axial direction, radially inwardly directed projections having an axial width corresponding to the at least one interrupted sections such that rotation of the outer bayonet ring relative to the valve housing and the air dryer cartridge permits the bayonet connection to be released,
the method further comprising:
guiding the outer bayonet ring along at least one of the collars into or out of a locked position of the bayonet connection.

* * * * *